US008762650B2

(12) United States Patent
Benhase et al.

(10) Patent No.: US 8,762,650 B2
(45) Date of Patent: *Jun. 24, 2014

(54) PREFETCHING TRACKS USING MULTIPLE CACHES

(75) Inventors: Michael T. Benhase, Tucson, AZ (US);
Binny S. Gill, Westford, MA (US);
Lokesh M. Gupta, Tucson, AZ (US);
James L. Hafner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 145 days.

This patent is subject to a terminal disclaimer.

(21) Appl. No.: 13/480,255

(22) Filed: May 24, 2012

(65) Prior Publication Data

US 2013/0024625 A1      Jan. 24, 2013

Related U.S. Application Data

(63) Continuation of application No. 13/189,271, filed on Jul. 22, 2011, now Pat. No. 8,650,354.

(51) Int. Cl.
*G06F 13/28*      (2006.01)
*G06F 12/12*      (2006.01)

(52) U.S. Cl.
CPC ................................ *G06F 12/12* (2013.01)
USPC ......................................................... 711/137

(58) Field of Classification Search
None
See application file for complete search history.

(56) References Cited

U.S. PATENT DOCUMENTS 6,381,677 B1    4/2002  Beardsley et al.
6,611,901 B1    8/2003  Micka et al.
2002/0178331 A1   11/2002  Beardsley et al.
2006/0069871 A1    3/2006  Gill et al.
2006/0090036 A1    4/2006  Zohar et al.
2010/0017591 A1    1/2010  Smith et al.
2011/0320687 A1   12/2011  Belluomini et al.

FOREIGN PATENT DOCUMENTS

CN          101833422        9/2010

OTHER PUBLICATIONS

NOA dated May 17, 2013, pp. 1-20, for U.S. Appl. No. 13/189,285, by inventors M.T. Benhase, B. Gill; L. Gupta, and J. Hafner, (18.421).
NOA dated Jun. 14, 2013, pp. 16, for U.S. Appl. No. 13/189,271, filed Jul. 22, 2011, by inventors M.T. Benhase, et al., (18.420).

(Continued)

*Primary Examiner* — Duc Doan
(74) *Attorney, Agent, or Firm* — Konrad Raynes Davda & Victor LLP; David W. Victor

(57) ABSTRACT

Provided are a computer program product, sequential access storage device, and method for managing data in a sequential access storage device receiving read requests and write requests from a system with respect to tracks stored in a sequential access storage medium. A prefetch request indicates prefetch tracks in the sequential access storage medium to read from the sequential access storage medium. The accessed prefetch tracks are cached in a non-volatile storage device integrated with the sequential access storage device, wherein the non-volatile storage device is a faster access device than the sequential access storage medium. A read request is received for the prefetch tracks following the caching of the prefetch tracks, wherein the prefetch request is designated to be processed at a lower priority than the read request with respect to the sequential access storage medium. The prefetch tracks are returned from the non-volatile storage device to the read request.

11 Claims, 18 Drawing Sheets

(56) References Cited

OTHER PUBLICATIONS

NOA dated Jun. 13, 2013, pp. 24, for U.S. Appl. No. 13/189329, filed Jul. 22, 2011, by inventors M.T. Benhase, et al., (18.422).

PCT International Search Report & Written Opinion dated Nov. 15, 2012 for Application No. PCT/IB2012/053351 filed Jul. 2, 2012.

English translation of CN101833422 filed Sep. 15, 2010.

U.S. Appl. No. 13/189,329, entitled "Prefetching Source Tracks for Destaging Updated Tracks in A Copy Relationship", by inventors M.T. Benhase, and L. Gupta, Total 37 pp. [18.422 (Appln)].

U.S. Appl. No. 13/189,285, entitled "Prefetching Data Tracks and Parity Data to Use for Destaging Updated Tracks", by inventors M.T. Benhase, B. Gill; L. Gupta, and J. Hafner, Total 35 pp. [18.421 (Appln)].

Information Technology Industry Council, "Information Technology-SCSI Block Commands-3 (SBC-3)", © 2004 ITI, American National Standard, Working Draft, Project T10/xxxx-D, Reference No. ISO/IEC 14776-xxx:200x ANSI INCITS.***:200x, Sep. 9, 2005, Total 146 pp.

Wikipedia, "Standard RAID Levels", [online], [Retrieved on Jun. 16, 2011]. Retrieved from the Internet at <URL:http://en.wikipedia.org/w/index.php?title=Standard_RAID_levels&printa . . . >, Total 13 pp.

Preliminary Amendment, Apr. 27, 2012, for U.S. Appl. No. US13/189,285, filed Jul. 22, 2011 by M.T. Benhase et al., Total 9 pp. [18.421 (PrelimAmend)].

Preliminary Amendment, Apr. 27, 2012, for U.S. Appl. No. US13/458,791, filed Apr. 27, 2012 by M.T. Benhase et al., Total 6 pp. [18.421C1 (PrelimAmend)].

Preliminary Amendment, May 1, 2012, for U.S. Appl. No. US13/189,329, filed Jul. 22, 2011 by M.T. Benhase et al., Total 9 pp. [18.422 (PrelimAmend)].

Preliminary Amendment, May 1, 2012, for U.S. Appl. No. US13/461,485, filed May 1, 2012 by M.T. Benhase et al., Total 6 pp. [18.422C1 (PrelimAmend)].

U.S. Appl. No. 13/189,271, filed Jul. 22, 2011, entitled "Prefetching Tracks Using Multiple Caches", invented by M.T. Benhase et al., Total 57 pp. [18.420 (Appln)].

U.S. Appl. No. 13/458,791, filed Apr. 27, 2012, entitled "Prefetching Data Tracks and Parity Data to Use for Destaging Updated Tracks", invented by M.T. Benhase et al., Total 35 pp. [18.421C1 (Appln)].

U.S. Appl. No. 13/461,485, filed May 1, 2012, entitled "Prefetching Source Tracks for Destaging Updated Tracks in A Copy Relationship", invented by M.T. Benhase et al., Total 37 pp. [18.422C1 (Appln)].

Preliminary Amendment, May 24, 2012, for U.S. Appl. No. US13/189,271, filed Jul. 22, 2011, by M.T. Benhase et al., Total 10 pp. [18.420 (PrelimAmend)].

NOA dated Apr. 23, 2013, pp. 1-21, for U.S. Appl. No. 13/189,271, filed Jul. 22, 2011, by inventors M.T. Benhase, et al., (18.420).

U.S. Appl. No. 14/150,763, filed Jan. 8, 2014.

First Cache Control Block

Second Cache Control Block

Non-Volatile Storage Control Block

Spatial Index Entry

PREFETCHING TRACKS USING MULTIPLE CACHES

CROSS-REFERENCE TO RELATED APPLICATION

This application is a continuation of U.S. patent application Ser. No. 13/189,271, filed Jul. 22, 2011, which application is incorporated herein by reference in its entirety.

BACKGROUND OF THE INVENTION

1. Field of the Invention

The present invention relates to a computer program product, system, and method for prefetching tracks using multiple caches.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU list for the accessed track is moved to a Most Recently Used (MRU) end of the list. If the requested track is not in the cache, i.e., a cache miss, then the track in the cache whose entry is at the LRU end of the list may be removed (or destaged back to storage) and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

The LRU cache technique seeks to optimize for temporal locality so as to destage tracks that are least likely to be rewritten soon in order to minimize the number of destage operations, i.e., if a write that is not destaged is overwritten than the destaging of the overwritten write is avoided, thus saving the time and effort of writing the data from cache to disk. On the other hand there is also a desire to destage in a manner that exploits spatial locality, which means that data is written to storage locations that are closest to each other to minimize the distance the storage device write mechanism and storage media needs to be moved to reach the next storage location to write.

One technique for exploiting both temporal and spatial locality is the Wise Ordering for Writes (WOW) algorithm. The WOW algorithm employs a circular linked list or clock where the circular linked list has one entry for each write request buffered in cache. The entries are ordered in the linked list according to the storage location to which the associated write request is directed to exploit the benefits of spatial locality. Further, each entry includes a bit indicating whether the write data for the storage location in the cache has been recently updated. The bit for an entry is set when the write data for the entry is updated. A pointer points to a current entry in the circular linked list. A task using the WOW algorithm accesses an entry addressed by the pointer. If the bit for the entry indicates that the data for the entry in cache has been recently updated, then the bit is set to indicate that the write data has not been recently updated and the pointer incremented to point to the next entry so that the entry having write data to a storage location next closest in spatial proximity to the previously written storage location is considered. The entry is selected to write that is closest in spatial proximity to the last written storage location and whose bit indicates that the write data for the entry has not recently been updated.

Thus, with the WOW algorithm, spatial locality is exploited because a next entry to write is selected for consideration that is closest in spatial proximity to the last destaged write request. Further, temporal locality is exploited because an entry that has recently been written will be skipped until the pointer circles back to that skipped entry to consider.

Disk drives may implement the WOW algorithm and other algorithms that take both the linear and the angular position of the write tracks into account and optimize for both with respect to a current write head position to determine the minimal total service time. This process is referred to as "command re-ordering based on seek and rotational optimization". The disk drive logic boards will analyze write requests and determine which to do first based on both how much time will be required to seek to the various cylinders and angular position of the track to write, and how much time will elapse waiting for the data to rotate under the heads.

There is a need in the art for improved techniques for using cache in a storage system.

SUMMARY

Provided are a computer program product, sequential access storage device, and method for managing data in a sequential access storage device receiving read requests and write requests from a system with respect to tracks stored in a sequential access storage medium. A prefetch request is received from the system indicating prefetch tracks in the sequential access storage medium and processed to read the prefetch tracks from the sequential access storage medium. The accessed prefetch tracks are cached in a non-volatile storage device integrated with the sequential access storage device, wherein the non-volatile storage device is a faster access device than the sequential access storage medium. A read request is received for the prefetch tracks following the caching of the prefetch tracks, wherein the prefetch request is designated to be processed at a lower priority than the read request with respect to the sequential access storage medium. The prefetch tracks are returned from the non-volatile storage device to the read request.

Provided are a computer program product, system, and method for requesting data from a sequential access storage device. A prefetch request is sent to the sequential access storage device to prefetch tracks in the sequential access storage device to a second cache device, wherein the prefetch request is designated to be processed in the sequential access storage device at a first priority. A read request is generated to read the prefetch tracks following the sending of the prefetch request, wherein the read request is designated to be processed at a second priority at the sequential access storage device, wherein the first priority has a lower priority processing in the sequential access storage device than the higher

DETAILED DESCRIPTION

Figure 1:
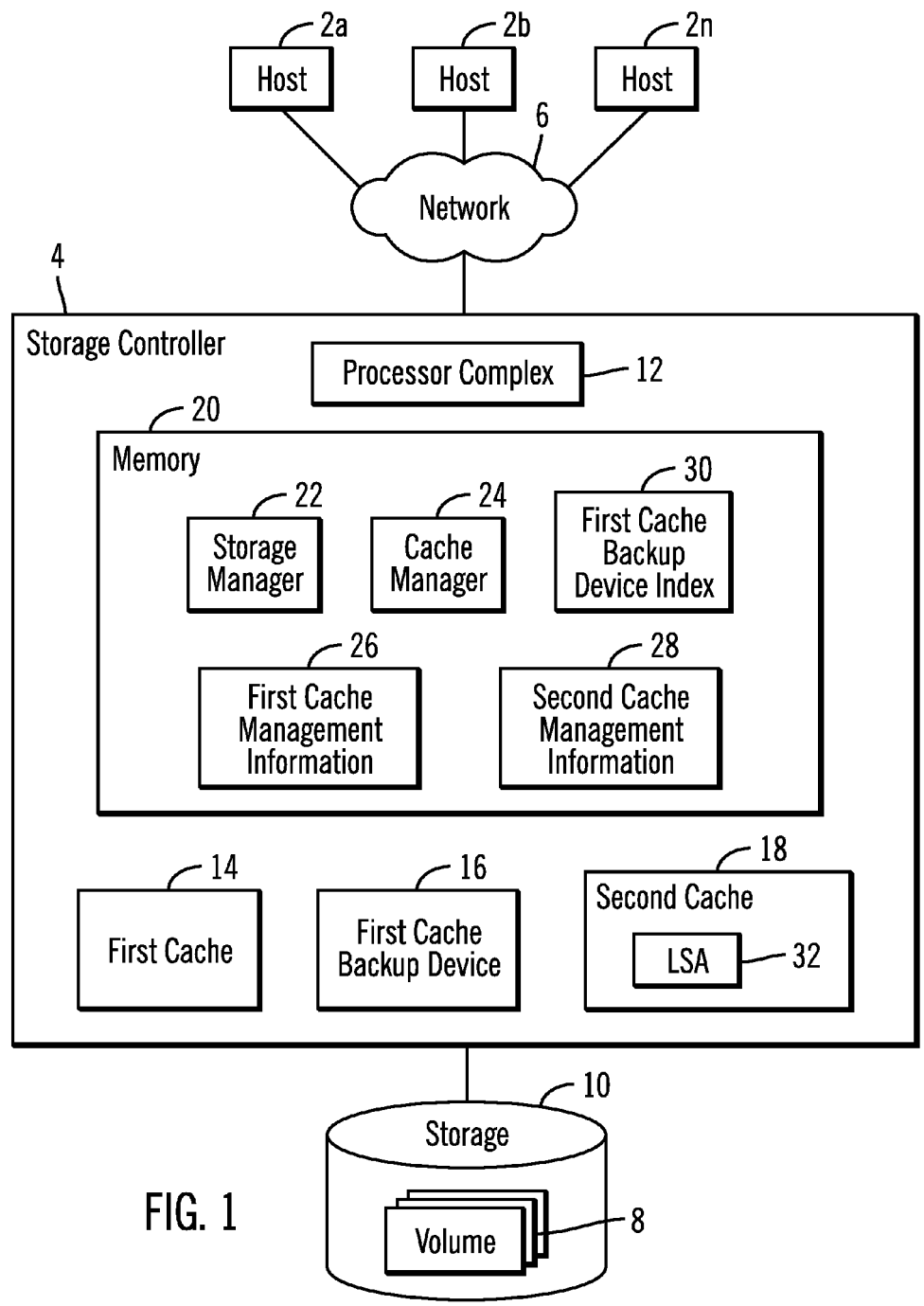
FIG. 1 illustrates an embodiment of a computing environment.

FIG. 1 illustrates an embodiment of a computing environment. A plurality of hosts 2a, 2b . . . 2n may submit Input/Output (I/O) requests to a storage controller 4 over a network 6 to access data at volumes 8 (e.g., Logical Unit Numbers, Logical Devices, Logical Subsystems, etc.) in a storage 10. The storage controller 4 includes a processor complex 12, including one or more processors with single or multiple cores, a first cache 14, a first cache backup device 16, to backup tracks in the cache 14, and a second cache 18. The first 14 and second 18 caches cache data transferred between the hosts 2a, 2b . . . 2n and the storage 10. The first cache backup device 16 may provide non-volatile storage of tracks in the first cache 14. In a further embodiment, the first cache backup device 16 may be located in a cluster or hardware on a different power boundary than that of the first cache 14.

The storage controller 4 has a memory 20 that includes a storage manager 22 for managing the transfer of tracks transferred between the hosts 2a, 2b . . . 2n and the storage 10 and a cache manager 24 that manages data transferred between the hosts 2a, 2b . . . 2n and the storage 10 in the first cache 14, first cache backup device 16, and the second cache 18. A track may comprise any unit of data configured in the storage 10, such as a track, Logical Block Address (LBA), etc., which is part of a larger grouping of tracks, such as a volume, logical device, etc. The cache manager 24 maintains first cache management information 26 and second cache management information 28 to manage read (unmodified) and write (modified) tracks in the first cache 14 and the second cache 18. A first cache backup device index 30 provides an index of track identifiers to a location in the first cache backup device 16.

The storage manager 22 and cache manager 24 are shown in FIG. 1 as program code loaded into the memory 20 and executed by the processor complex 12. Alternatively, some or all of the functions may be implemented in hardware devices in the storage controller 4, such as in Application Specific Integrated Circuits (ASICs).

The second cache 18 may store tracks in a log structured array (LSA) 32, where tracks are written in a sequential order as received, thus providing a temporal ordering of the tracks written to the second cache 18. In a LSA, later versions of tracks already present in the LSA are written at the end of the LSA 32. In alternative embodiments, the second cache 18 may store data in formats other than in an LSA.

In one embodiment, the first cache 14 may comprise a Random Access Memory (RAM), such as a Dynamic Random Access Memory (DRAM), and the second cache 18 may comprise a flash memory, such as a solid state device, and the storage 10 is comprised of one or more sequential access storage devices, such as hard disk drives and magnetic tape. The storage 10 may comprise a single sequential access storage device or may comprise an array of storage devices, such as a Just a Bunch of Disks (JBOD), Direct Access Storage Device (DASD), Redundant Array of Independent Disks (RAID) array, virtualization device, etc. In one embodiment, the first cache 14 is a faster access device than the second cache 18, and the second cache 18 is a faster access device than the storage 10. Further, the first cache 14 may have a greater cost per unit of storage than the second cache 18 and the second cache 18 may have a greater cost per unit of storage than storage devices in the storage 10.

The first cache 14 may be part of the memory 20 or implemented in a separate memory device, such as a DRAM. In one embodiment, the first cache backup device 16 may comprise a non-volatile backup storage (NVS), such as a non-volatile memory, e.g., battery backed-up Random Access Memory (RAM), static RAM (SRAM), etc.

The network 6 may comprise a Storage Area Network (SAN), a Local Area Network (LAN), a Wide Area Network (WAN), the Internet, and Intranet, etc.

Figure 2:
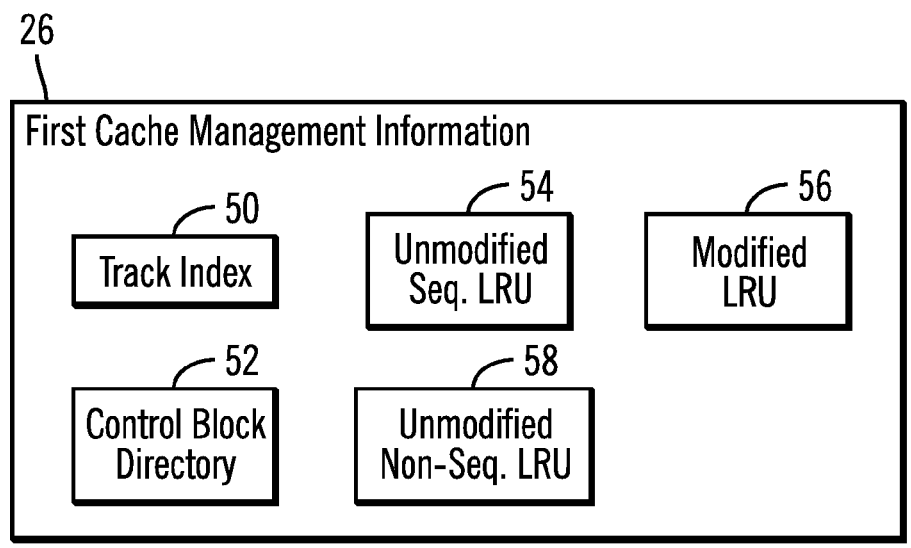
FIG. 2 illustrates an embodiment of first cache management information.

FIG. 2 illustrates an embodiment of the first cache management information 26 including a track index 50 providing an index of tracks in the first cache 14 to control blocks in a control block directory 52; an unmodified sequential LRU list 54 providing a temporal ordering of unmodified sequential tracks in the first cache 14; a modified LRU list 56 providing a temporal ordering of modified sequential and non-sequential tracks in the first cache 14; and an unmodified non-sequential LRU list 58 providing a temporal ordering of unmodified non-sequential tracks in the first cache 14.

In certain embodiments, upon determining that the first cache backup device 16 is full, the modified LRU list 56 is used to destage modified tracks from the first cache 14 so that the copy of those tracks in the first cache backup device 16 may be discarded to make room in the first cache backup device 16 for new modified tracks.

Figure 3:
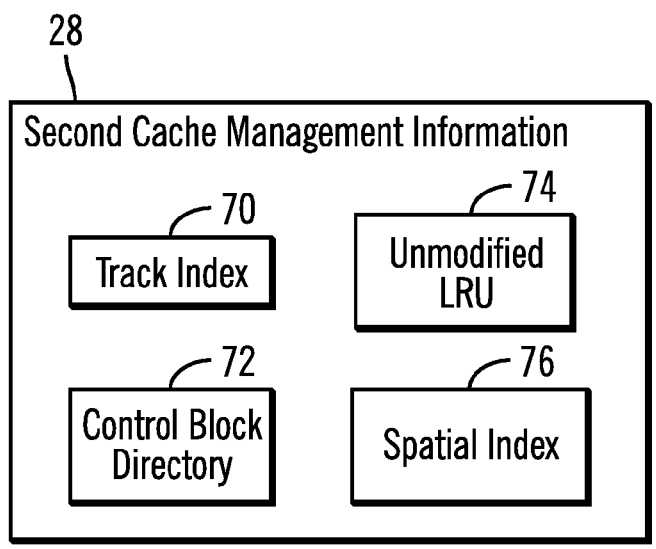
FIG. 3 illustrates an embodiment of second cache management information.

FIG. 3 illustrates an embodiment of the second cache management information 28 including a track index 70 providing an index of tracks in the second cache 18 to control blocks in a control block directory 72; an unmodified list 74 providing a temporal ordering of unmodified tracks in the second cache 18; and a spatial index 76 providing a spatial ordering of the modified tracks in the second cache 18 based on the physical locations in the storage 10 at which the modified tracks are stored.

All the LRU lists 54, 56, 58, and 74 may include the track IDs of tracks in the first cache 14 and the second cache 18 ordered according to when the identified track was last accessed. The LRU lists 54, 56, 58, and 74 have a most recently used (MRU) end indicating a most recently accessed track and a LRU end indicating a least recently used or accessed track. The track IDs of tracks added to the caches 14 and 18 are added to the MRU end of the LRU list and tracks demoted from the caches 14 and 18 are accessed from the LRU end. The track indexes 50 and 70 and spatial index 76 may comprise a scatter index table (SIT). Alternative type data structures may be used to provide the temporal ordering of tracks in the caches 14 and 18 and spatial ordering of tracks in the second cache 18.

Non-sequential tracks may comprise Online Line Transaction Processing (OLTP) tracks, which often comprise small block writes that are not fully random and have some locality of reference, i.e., have a probability of being repeatedly accessed.

Figure 4:
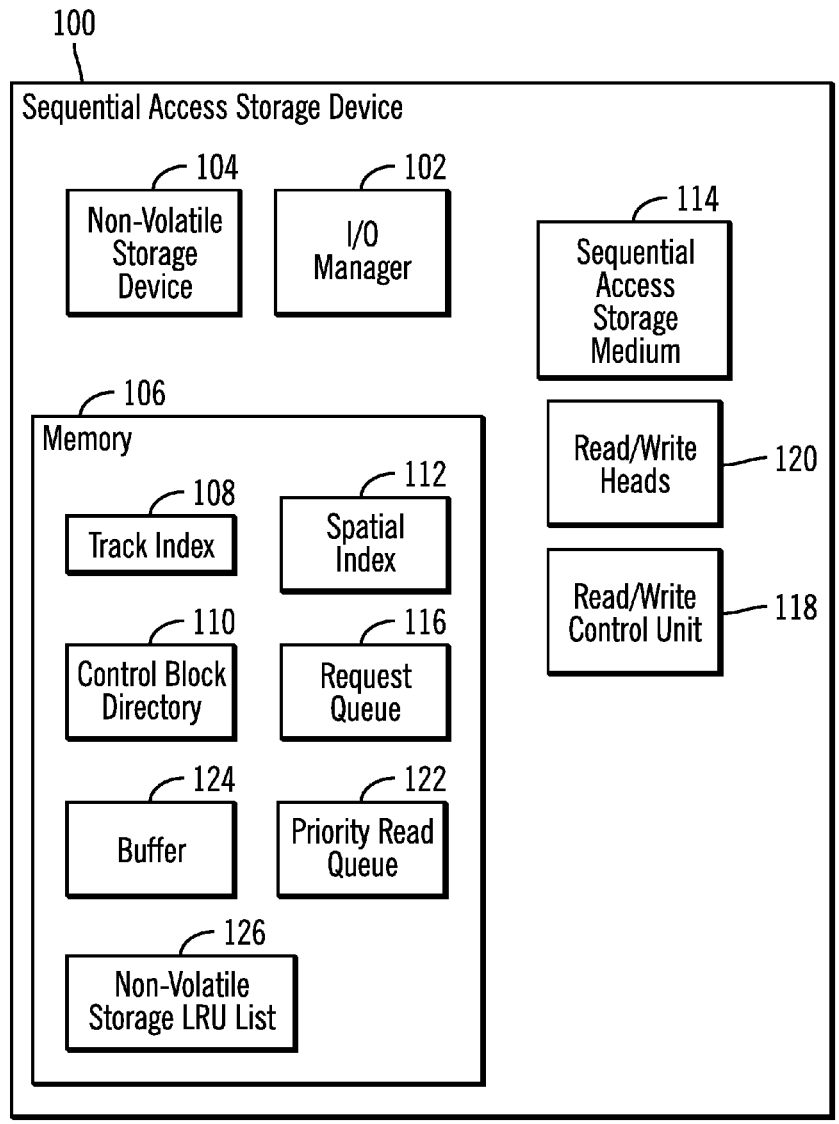
FIG. 4 illustrates an embodiment of a sequential access storage device.

FIG. 4 illustrates an embodiment of a sequential access storage device 100, where the storage 10 may be implemented with one or multiple sequential access storage devices 100. The sequential access storage device 100 includes control logic shown as the I/O manager 102, a non-volatile storage device 104 to buffer modified data, and a memory 106 including a track index 108 providing an index of tracks in the non-volatile storage device 104 to control blocks in a control block directory 110; a spatial index 112 providing a spatial ordering of the tracks (both read and write) in the non-volatile storage 104 on the physical locations in a sequential access storage medium 114 at which the tracks to read or write are stored; and a request queue 116 in which read and write requests are queued. Entries in the request queue 116 may identify the type of request, read or write, and the requested tracks, whose location on the sequential access storage medium 114 can be determined from the spatial index 112. The I/O manager 102 adds read and write request to the request queue 112, and accesses read and write requests from the request queue 112 to execute against a sequential access medium 114. The I/O manager 102 may send commands to a read/write control unit 118 that generates control signals to move one or more actuators having read/write heads 120 to a position on the sequential access storage medium 114 at which data can be read or written.

The memory 106 further includes a read priority queue 122 to buffer high priority read requests. Lower or non-high priority read requests are added to the request queue 116. The storage controller 4 may indicate the priority of read requests submitted to the sequential access storage device 100 in a header field of the read request. In certain embodiments read requests in the priority read queue 122 and the request queue 116 are read based on a temporal order, or order in which they were added to the queues 116 and 122, where the queues may comprise LRU queues. Destage requests are added to the request queue 116 based on a temporal order in which write requests are received. Modified tracks in the non-volatile storage device 104 are destaged based on the spatial index 112 so when a destage request is processed in the request queue 116, based on the temporal order in which the destage request was added to the request queue 116, the modified tracks in the non-volatile storage device 104 are selected using the spatial index 112 based on the current position of the read write head 120.

A buffer 124 in the device 100 may temporarily buffer read and write input requests and data being returned to a read request. The buffer 124 may also be used to temporarily buffer modified tracks for write requests not maintained in the non-volatile storage device, such as for sequential write requests and their modified data. The buffer 124 may be in a separate device than the non-volatile storage device 104 and may comprise smaller storage space than available in the non-volatile storage device 104. Alternatively, some or all of the buffer 124 may be implemented in the non-volatile storage device.

A non-volatile storage (NVS) LRU list 126 provides an LRU queue for tracks buffered in the non-volatile storage device 104, including modified tracks to write to the sequential access storage medium 114 and prefetch tracks. The NVS LRU list 126 may be used to determine tracks to remove from the non-volatile storage device 104 if space needs to be freed in the non-volatile storage device 104.

The sequential access storage medium 114 may comprise one or more hard disk drive platters for a hard disk drive device or magnetic tape. In certain embodiments, the non-volatile storage device 104 may comprise a flash memory device comprised of solid state storage. In certain embodiments, the non-volatile storage device 104, e.g., flash memory, is implemented on the sequential access storage device 100 circuit board within the enclosure including the sequential access storage device 100 components. For instance, the may comprise an 8 GB flash memory device.

Some or all of the functions of the I/O manager 102 may be implemented as code executed by a processor in the sequential access storage device 100. Alternatively, some or all of the functions of the I/O manager 102 may be implemented in an ASIC on the sequential access storage device 100.

Figure 5:
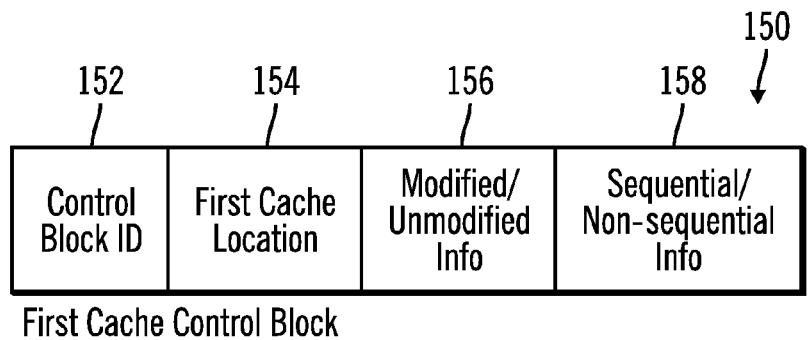
FIG. 5 illustrates an embodiment of a first cache control block.

FIG. 5 illustrates an embodiment of a first cache control block 150 entry in the control block directory 52, including a control block identifier (ID) 152, a first cache location 154 of the physical location of the track in the first cache 14, information 156 indicating whether the track is modified or unmodified, and information 158 indicating whether the track is a sequential or non-sequential access.

Figure 6:
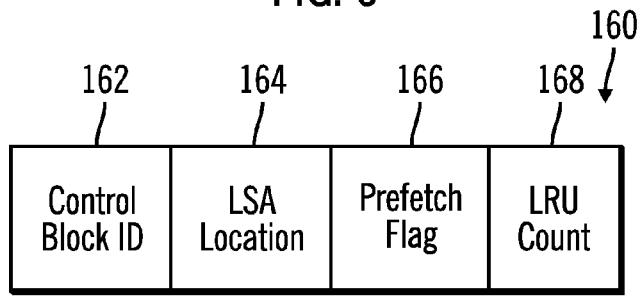
FIG. 6 illustrates an embodiment of a second cache control block.

FIG. 6 illustrates an embodiment of a second cache control block 160 entry in the second cache control block directory 72, including a control block identifier (ID) 162 and an LSA location 164 where the track is located in the LSA 32. In certain embodiments, the second cache control block 160 may further include a prefetch flag 166 indicating whether the track is for a pre-fetch operation and an LRU count 168 indicating a number of times the track has been placed at the most recently used (MRU) end of the unmodified LRU list 74 while in the second cache 18. In certain embodiments, tracks that are read from the storage 10 as part of a prefetch operation may be maintained in the second cache 18 longer by moving an indicator for the track in the second cache 18 multiple times to the MRU end of the unmodified LRU list 74 for a predetermined number of times, before being removed to free space. The unmodified LRU list 74 may identify unmodified non-sequential tracks demoted from the first cache 14 and promoted to the second cache 18 and pre-fetch tracks read from the storage 10 to pre-fetch for subsequent operations.

Figure 7:
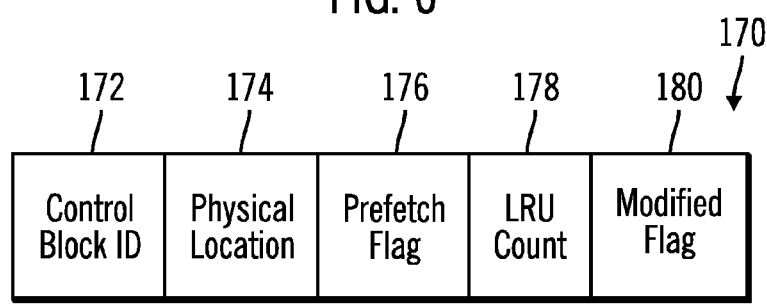
FIG. 7 illustrates an embodiment of a non-volatile storage cache control block.

FIG. 7 illustrates an embodiment of a non-volatile storage control block 170 entry in the non-volatile storage 104 control block directory 110, including a control block identifier (ID) 172 and a physical location 174 at which the track is located, such as an LSA location if the track is stored in a LSA on the non-volatile storage device. In certain embodiments, the non-volatile storage control block 170 may include a prefetch flag 176 indicating whether the track was read from the sequential access storage medium 114 and placed in the non-volatile storage device 104 as part of a prefetch operation; an LRU count 178 indicating a number of times the track has been placed at the most recently used (MRU) end of the unmodified LRU list 74 while in the non-volatile storage device 104; and a modified flag 180 indicating whether the track has modified data to write to the sequential access storage medium 114. In certain embodiments, tracks that are read from the sequential access storage medium 114 as part of a prefetch operation may be maintained in the non-volatile storage device 104 longer by moving an indicator for the track in the second cache 18 multiple times to the MRU end of the unmodified LRU list 74 for a predetermined number of times, before being removed to free space. Further, a track in the non-volatile storage device 104 may be both a modified track to destage and a prefetch track.

Figure 8:
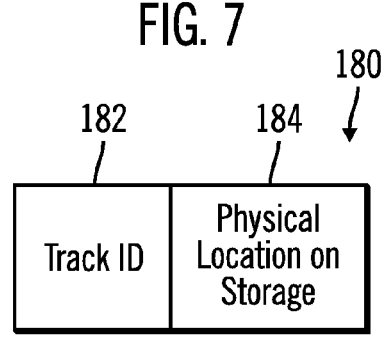
FIG. 8 illustrates an embodiment of a spatial index entry.

FIG. 8 illustrates a spatial index entry 180 including a track identifier 182 of a track in the non-volatile storage device 104 and the physical location 184 of where the track to read or write is stored in the sequential access storage medium 114, such as a cylinder, platter number, angular position on the cylinder, etc.

Figure 9:
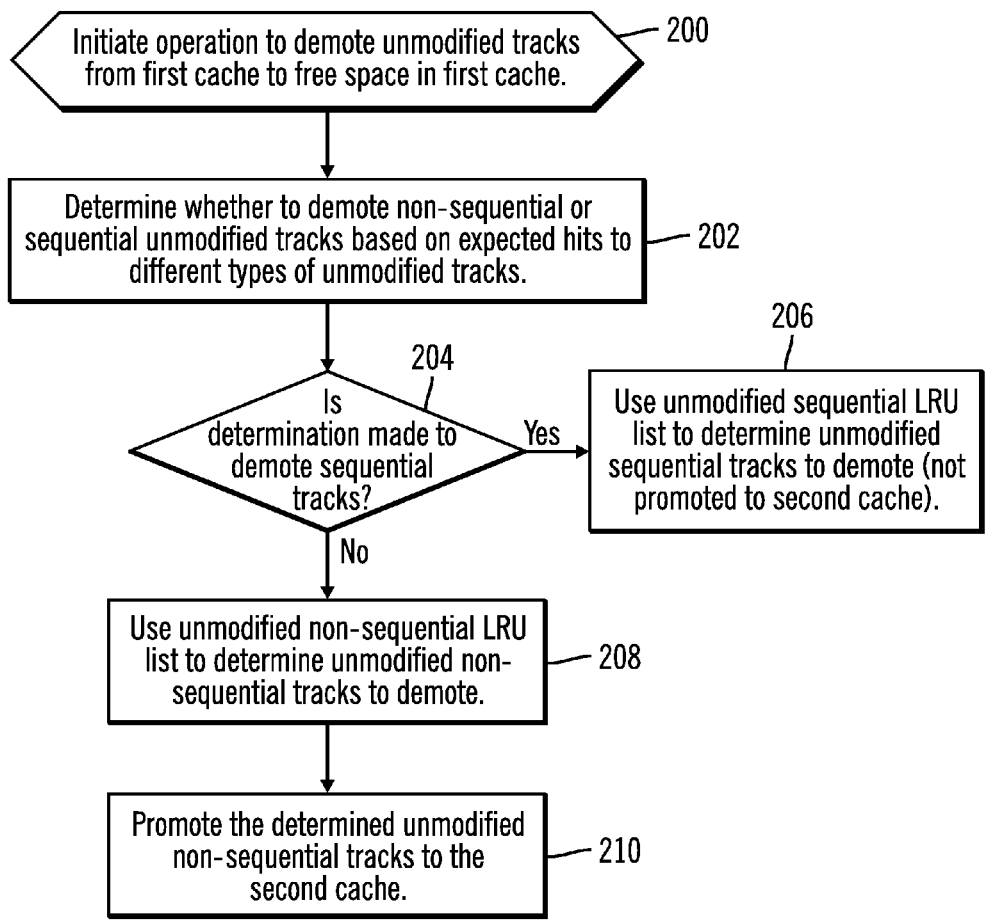
FIG. 9 illustrates an embodiment of operations to determine whether to remove tracks in the first cache to free space for tracks to add to the first cache.

FIG. 9 illustrates an embodiment of operations performed by the cache manager 24 to demote unmodified tracks from the first cache 14. The demote operation may be initiated upon determining to free space in the first cache 14. Upon initiating (at block 200) an operation to determine whether to remove tracks from the first cache 14 to accommodate tracks being added to the first cache 14, the cache manager 24 determines (at block 202) whether to demote non-sequential or sequential unmodified tracks based on expected hits to different types of unmodified tracks. If (at block 204) the determination is to demote unmodified sequential tracks, then the cache manager 24 uses (at block 206) the unmodified sequential LRU list 54 to determine unmodified sequential tracks to demote, from the LRU end of the list, which are not promoted to the second cache 18. If (at block 204) the determination is made to demote unmodified non-sequential tracks, then the cache manager 24 uses the unmodified non-sequential LRU list 58 to determine (at block 208) unmodified non-sequential tracks to demote. The unmodified non-sequential tracks are promoted (at block 210) to the second cache 18.

Figure 10:
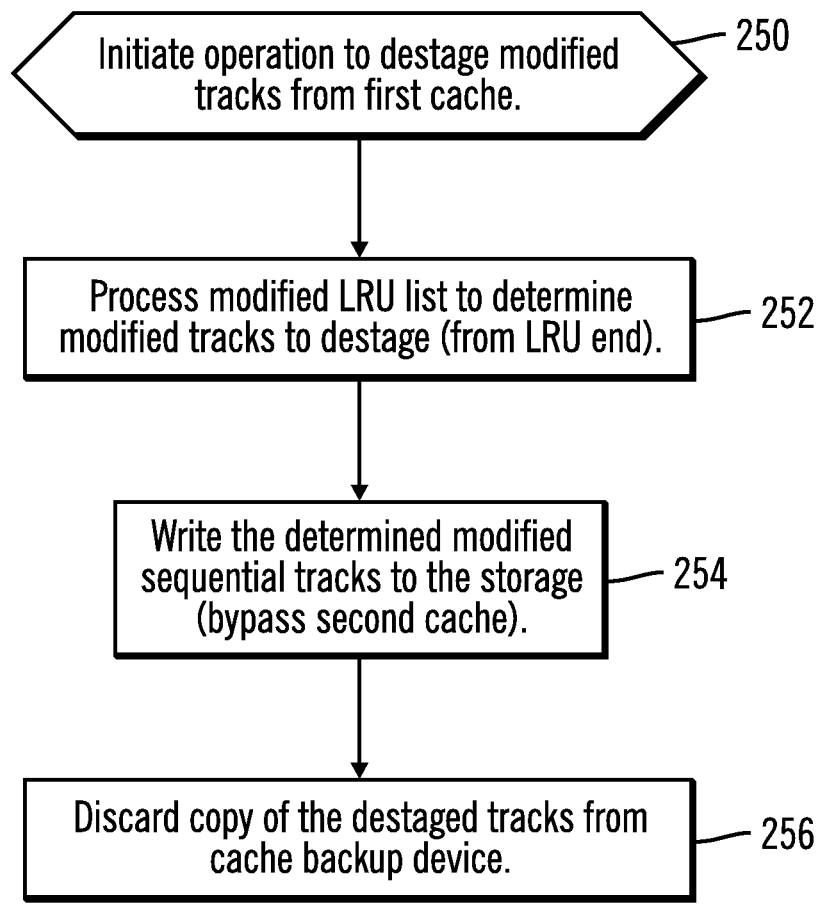
FIG. 10 illustrates an embodiment of operations to free space in the first cache.

FIG. 10 illustrates an embodiment of operations performed by the cache manager 24 to destage modified tracks from the first cache 14. The cache manager 24 may regularly destage tracks as part of scheduled operations and increase the rate of destages if space is needed in the first cache backup device 16. Upon initiating (at block 250) the operation to destage modified tracks, the cache manager 24 processes (at bock 252) the modified LRU list 56 to determine modified tracks to destage, from the LRU end of the LRU list 56. The cache manager 24 writes (at block 254) the determined modified tracks (sequential or non-sequential) to the storage 10, bypassing the second cache 18. The cache manager 24 discards (at block 260) the copy of the destaged modified tracks from the first cache backup device 16.

With the operations of FIGS. 9 and 10, non-sequential tracks are demoted but not promoted to the second cache 18. Modified tracks (writes) are written directly to the storage 10, bypassing the second cache. Sequential unmodified tracks (reads) are discarded and not copied elsewhere, and unmodified non-sequential tracks demoted from the first cache 14 are promoted to the second cache 18.

Figure 11:
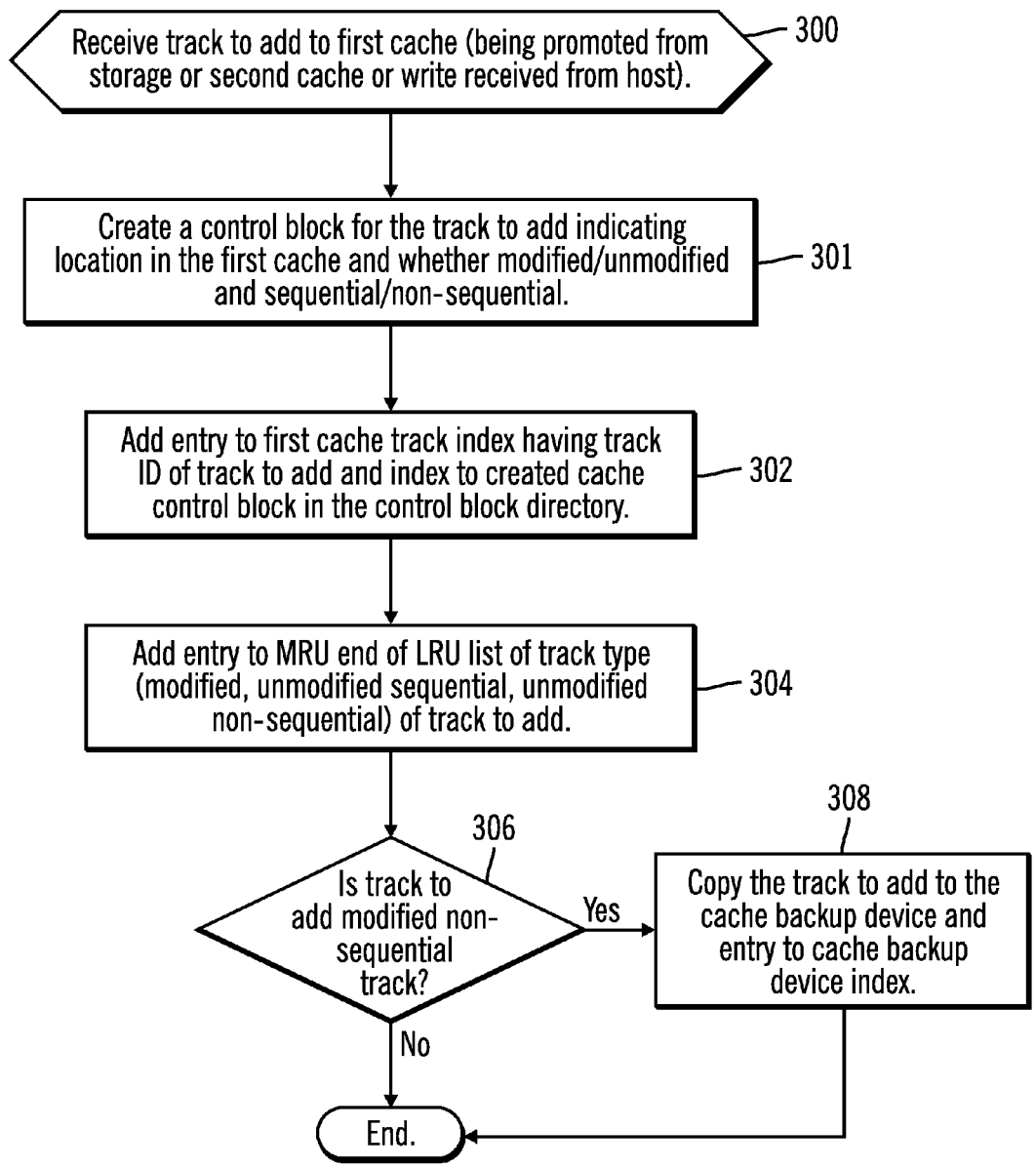
FIG. 11 illustrates an embodiment of operations to add a track to the first cache.

FIG. 11 illustrates an embodiment of operations performed by the cache manager 24 to add, i.e., promote, a track to the first cache 14, which track may comprise a write or modified track from a host 2a, 2b . . . 2n, a non-sequential track in the second cache 18 that is subject to a read request and as a result moved to the first cache 14, or read requested data not found in either cache 14 or 18 and retrieved from the storage 10. Upon receiving (at block 300) the track to add to the first cache 14, the cache manager 24 creates (at block 301) a control block 150 (FIG. 5) for the track to add indicating the 154 location in the first cache 14 and whether the track is modified/unmodified 156 and sequential/non-sequential 158. This control block 150 is added to the control block directory 52 of the first cache 14. The cache manager 24 adds (at block 302) an entry to first cache track index 50 having the track ID of track to add and an index to the created cache control block 150 in the control block directory 52. An entry is added (at block 304) to the MRU end of the LRU list 54, 56 or 58 of the track type of the track to add. If (at block 306) the track to add is a modified non-sequential track, then the track to add is also copied (at block 308) to the first cache backup device 16 and an entry is added to the first cache backup device index 30 for the added track. If (at block 306) the track to add is unmodified sequential, control ends.

Figure 12:
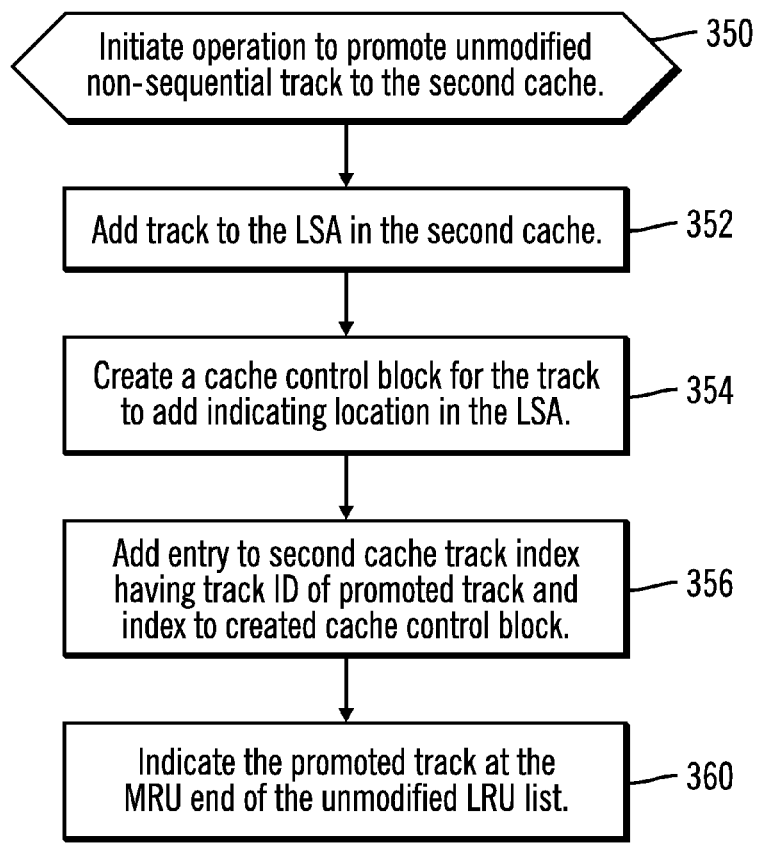
FIG. 12 illustrates an embodiment of operations to promote a track to the second cache.

FIG. 12 illustrates an embodiment of operations performed by the cache manager 24 to promote an unmodified non-sequential track to the second cache 18 that is being demoted from the first cache 14. Upon initiating (at block 350) the operation to promote a track to the second cache 18, the cache manager 24 adds (at block 352) the track being promoted to the LSA 32 in the second cache 18 and creates (at block 354) a control block 160 (FIG. 6) for the track to add indicating the track location 164 in the LSA 32. An entry is added (at block 356) to the second cache track index 70 having the track ID of the promoted track and an index to the created cache control block 160 in the control block directory 72 for the second cache 18. The cache manager 24 indicates (at block 360) the promoted track at the MRU end of the unmodified LRU list 74, such as by adding the track ID to the MRU end.

The cache manager 12 may use the second cache 18 as a read-only cache for only unmodified sequential tracks. Modified sequential and non-sequential tracks are written directly to the sequential access storage device 100 and the non-volatile storage device 104 in the sequential access storage device 100 provides a write cache for modified non-sequential tracks.

Figure 13:
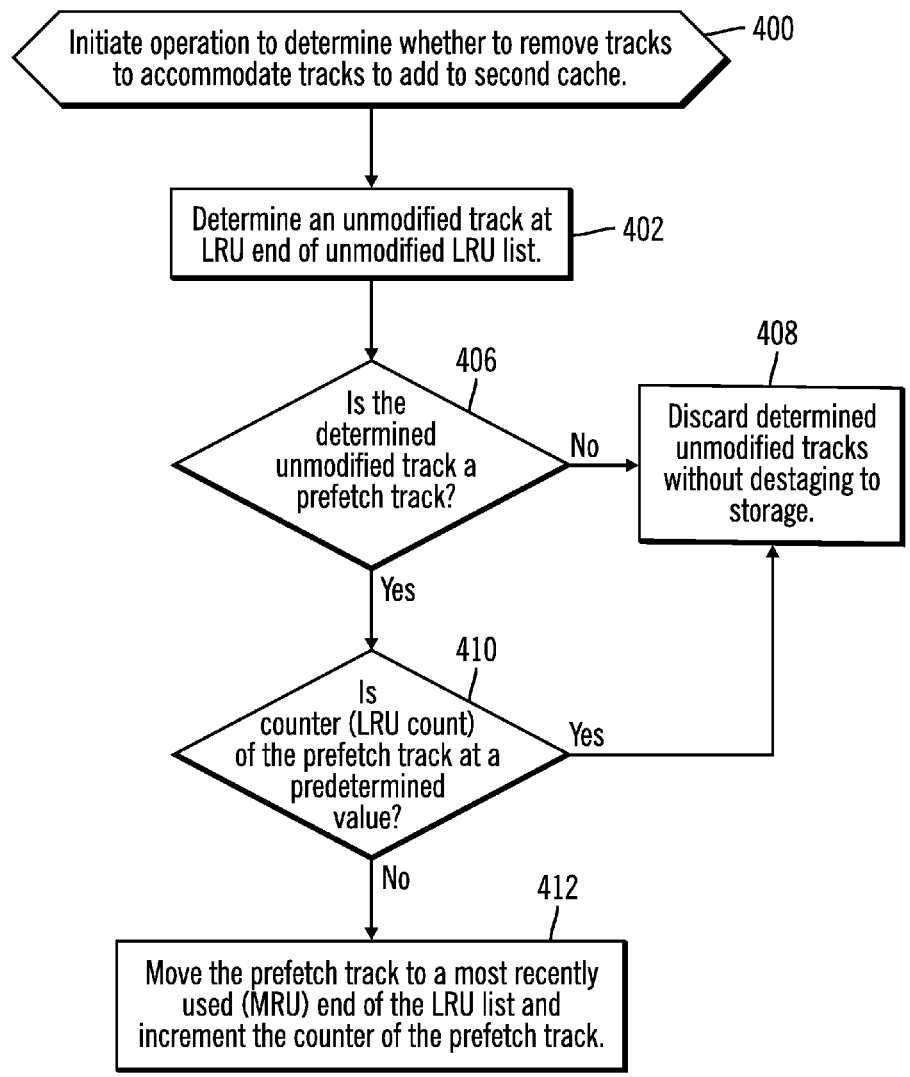
FIG. 13 illustrates an embodiment of operations to free space in the second cache.

FIG. 13 illustrates an embodiment of operations performed by the cache manager 24 to free space in the second cache 18 for new tracks to add to the second cache 18, i.e., tracks being demoted from the first cache 14. Upon initiating this operation (at block 400) the cache manager 24 determines (at block 402) unmodified tracks in the second cache 18 from the LRU end of the unmodified LRU list 74. If (at block 406) the determined unmodified track is not a prefetch track, as indicated by prefetch flag 166, then the track is discarded (at block 408). If (at block 406) the track to destage is a prefetch track and if (at block 410) the LRU count 160 of the prefetch track is a predetermined value, then control proceeds to block 408 to discard the prefetch track, even if it has not yet been accessed by a read operation to access the prefetch track. Otherwise, if the LRU count 168 is not the predetermined value, then the cache manager 24 moves (at block 412) an indicator for the prefetch track to a most recently used (MRU) end of the unmodified LRU list 74 and increments the LRU count 168 of the prefetch track. In this way, a prefetch track in the second cache 18 goes through the unmodified LRU list 74 a predetermined number of times before being removed from the second cache 18 to free space. This leaves the prefetch track in the second cache 18 longer to be available for a read request.

Figure 14:
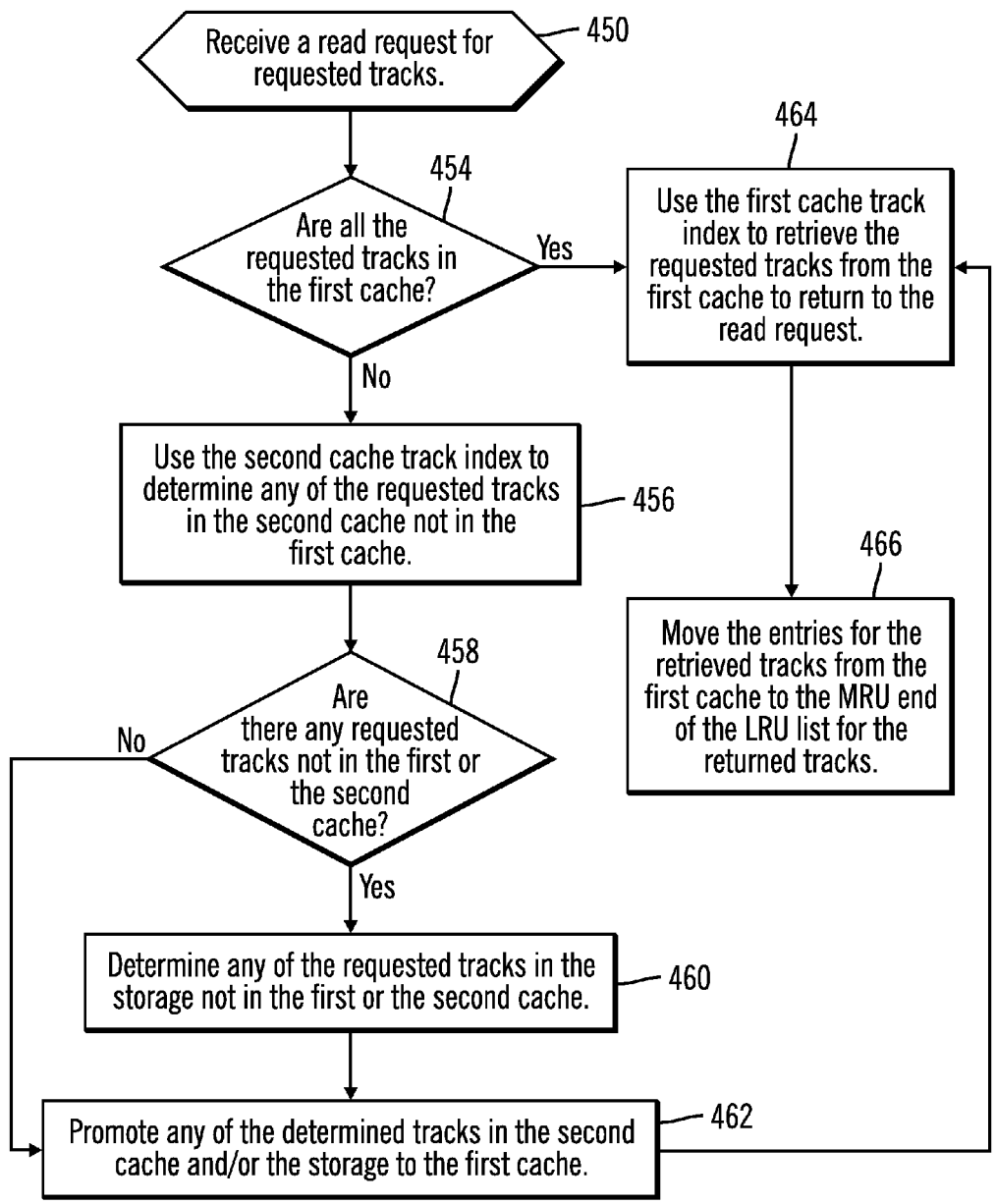
FIG. 14 illustrates an embodiment of operations to process a read request for requested tracks.

FIG. 14 illustrates an embodiment of operations performed by the cache manager 24 to retrieve requested tracks for a read request from the caches 14 and 18 and storage 10. The storage manager 22 processing the read request may submit requests to the cache manager 24 for the requested tracks. Upon receiving (at block 450) the request for the tracks, the cache manager 24 uses (at block 454) the first cache track index 50 to determine whether all of the requested tracks are in the first cache 14. If (at block 454) all requested tracks are not in the first cache 14, then the cache manager 24 uses (at block 456) the second cache track index 70 to determine any of the requested tracks in the second cache 18 not in the first cache 14. If (at block 458) there are any requested tracks not found in the first 14 and second 18 caches, then the cache manager 24 determines (at block 460) any of the requested tracks in the storage 10, from the second cache track index 70, not in the first 14 and the second 18 caches. The cache manager 24 then promotes (at block 462) any of the determined tracks in the second cache 18 and the storage 10 to the first cache 14. The cache manager 24 uses (at block 464) the first cache track index 50 to retrieve the requested tracks from the first cache 14 to return to the read request. The entries for the retrieved tracks are moved (at block 466) to the MRU end of the LRU list 54, 56, 58 including entries for the retrieved tracks. With the operations of FIG. 13, the cache manager 24 retrieves requested tracks from a highest level cache 14, then second cache 18 first before going to the storage 10, because the caches 14 and 18 would have the most recent modified version of a requested track. The most recent version is first found in the first cache 14, then the second cache 18 if not in the first cache 14 and then the storage 10 if not in either cache 14, 18.

With the operations of FIG. 14, the cache manager 24 gathers requested tracks from a highest level cache 14 (first cache device), then the second cache 18 (second cache device) before going to the storage 10, because the caches 14 and 18 would provide the fastest access to requested tracks and the first cache 14 provides the most recent modified version of a requested track.

Figure 15:
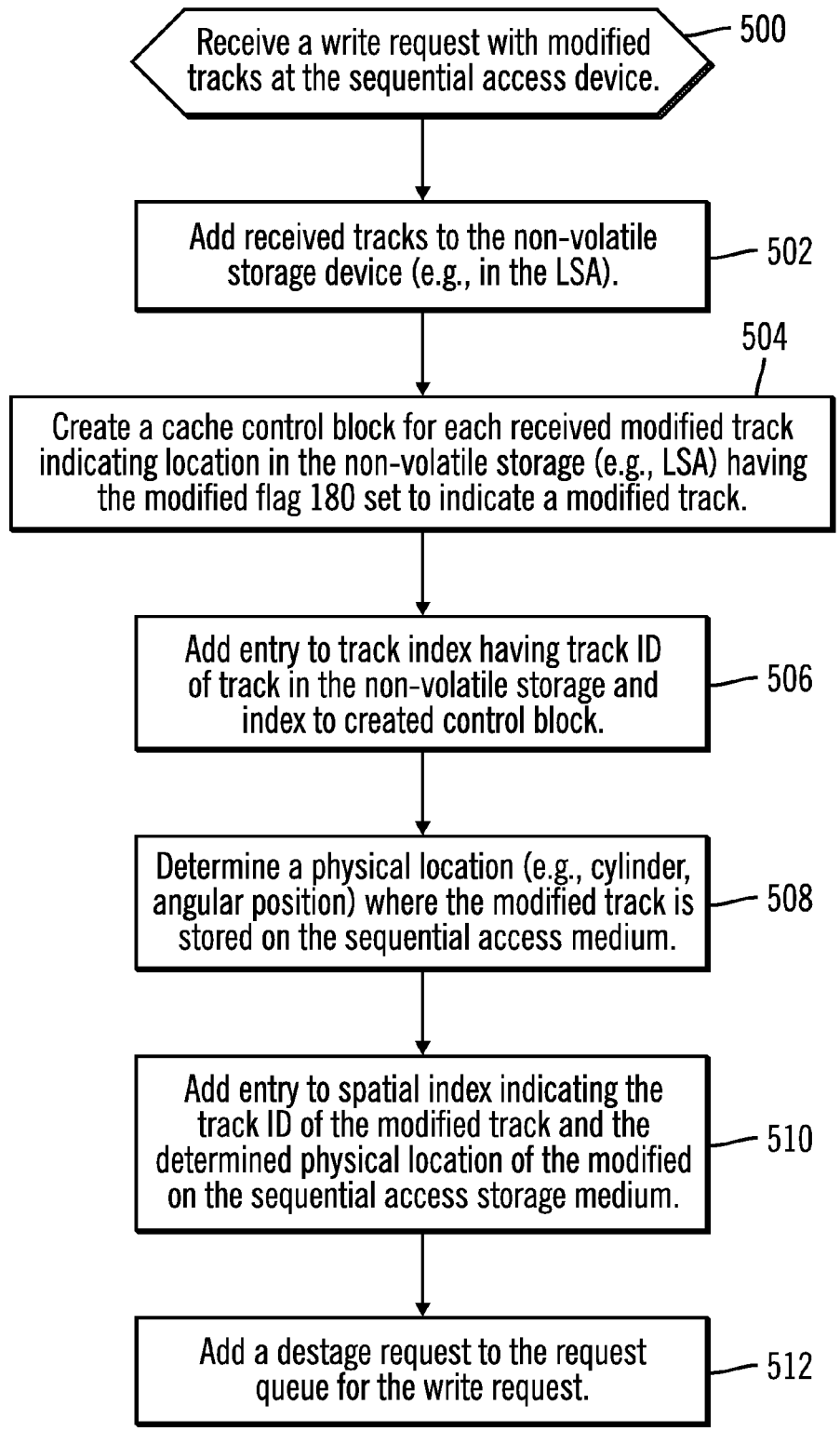
FIG. 15 illustrates an embodiment of operations at the sequential access storage device to process a write request.

FIG. 15 illustrates an embodiment of operations performed by the I/O manager 102 at the sequential access storage device 100 to process a write request with modified tracks for the sequential access storage medium 114. Upon receiving (at block 500) the write request, the I/O manager 102 adds (at block 502) the received modified tracks to the non-volatile storage device 104, which operates as a second cache device to the first cache 14. In one embodiment, the tracks may be added to an LSA in the non-volatile storage device 104 or stored in another format in the device 104. The I/O manager 102 creates (at block 504) a cache control block 170 (FIG. 7) for each received modified track indicating a location 174 in the non-volatile storage device 104 (e.g., LSA location) of the modified track. The modified flag 180 in the cache control block 170 for the added modified track is set to indicate the track is modified. An entry is added (at block 506) to the track index 108 having the track ID of modified track in the non-volatile storage device 104 and index to the created control block 170.

The I/O manager 102 determines (at block 508) a physical location of where the modified track is stored on the sequential access storage medium 114, such as a cylinder on the media. Further, in an additional embodiment, the determined physical location included in the spatial index 112 may also include an angular position on the cylinder of the modified track (also referred to as the sector). The I/O manager 102 adds (at block 510) an entry to the spatial index 112 indicating the track ID 182 of the modified track and the determined physical location 184 of the modified on the sequential access storage medium 114. The I/O manager 102 further adds (at block 512) a destage request to the request queue 116 for each track to write. This destage request may not identify the specific modified track to demote, which is later determined using an algorithm to reduce the total access time to perform the write.

Figure 16:
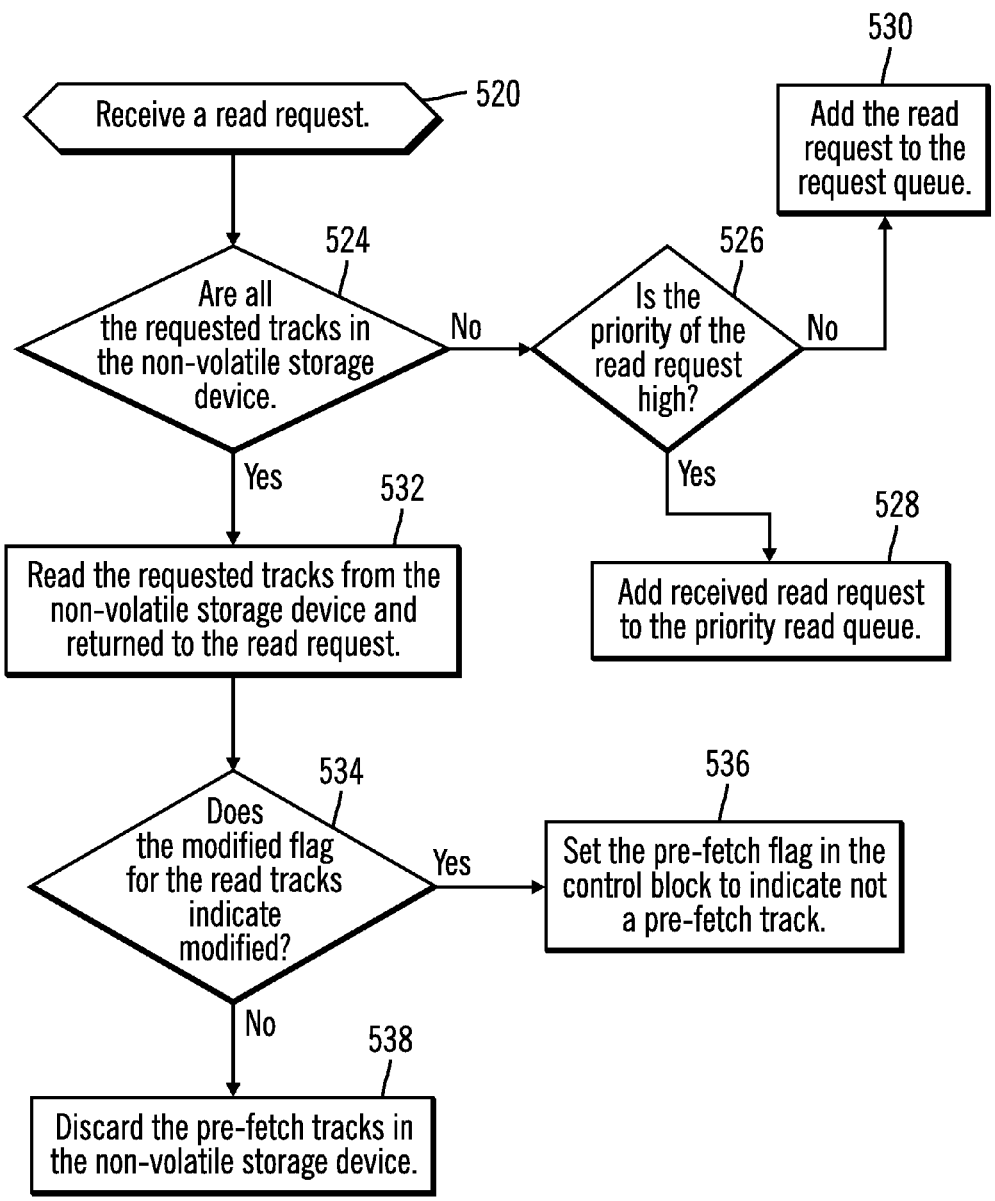
FIG. 16 illustrates an embodiment of operations at the sequential access storage device to process a read request.

FIG. 16 illustrates an embodiment of operations performed by the I/O manager 102 at the sequential access storage device 100 to process a read request directed to tracks in the sequential access storage medium 114. Upon receiving (at block 520) the read request, the I/O manager 102 determines (at block 524) whether all the requested tracks are in the non-volatile storage device 104. If not (from the no branch of block 524) and if (at block 526) the priority of the request is high, then the read request is added (at block 528) to the priority read queue 122. Otherwise, if (from the no branch of block 526) the priority is not high, then the read request is added (at block 530) to the request queue 116. If (at block 524) all the requested tracks are in the non-volatile storage device 104, then the requested tracks are read (at block 532) from the non-volatile storage device 104 and returned to the read request. If (at block 534) the modified flag 180 for the read modified tracks indicates that the read tracks are modified, then the I/O manager 102 sets (at block 536) the prefetch flag 176 in the control block to indicate that the read tracks are not prefetch tracks because the prefetch tracks have just been read, indicating the read intended for the prefetch tracks has likely been performed. However, these tracks are maintained in the non-volatile storage device 104 if they are modified and need to be destaged to the sequential access storage medium 114. If (at block 534) the read tracks are not modified, then the read prefetch tracks are discarded (at block 538) to free space in the non-volatile storage device 104.

Figure 17:
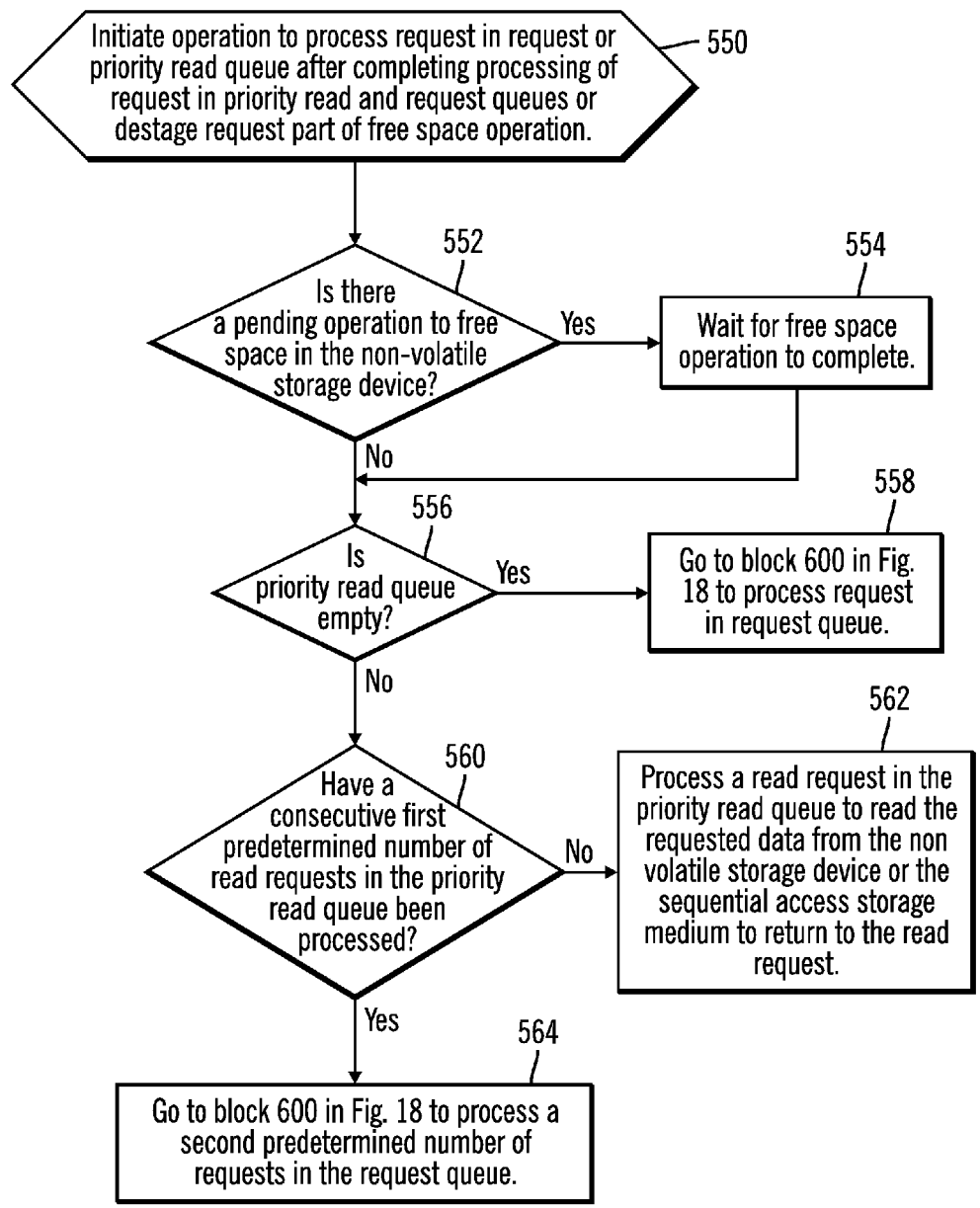
FIG. 17 illustrates an embodiment of operations at the sequential access storage device to process the request queue and the priority read queue.

FIG. 17 illustrates an embodiment of operations performed by the I/O manager 102 to process a request in one of the queues 116 and 122 after completing the processing of a request in the priority read queue 122, the request queue 116 or a destage request processed as part of an operation to free space to the non-volatile storage device 104. Upon initiating (at block 550) the operation to process a request in one of the queues 116, 122, the I/O manager 102 determines (at block 552) if there is a pending destage operation to free space in the non-volatile storage device 100. If so (at block 552), then the I/O manager 102 suspends (at block 554) processing of requests in the request queue 116 and the priority read queue 122 until the free space operation completes as described with respect to FIG. 26. If (at block 552) there is no pending destage operation to free space or after unsuspending processing the request queue after freeing space (from block 554), if (at block 556) the priority read queue 122 is empty, then control proceeds (at block 558) to block 600 in FIG. 18 to process the request queue 116. If the priority read queue 122 has pending requests, then the I/O manager 104 determines (at block 560) whether a consecutive first predetermined number of read requests in the priority read queue have just been processed to prevent starvation at the request queue 116. If (at block 560) the I/O manager 104 has not just completed processing the consecutive first predetermined number of high priority read requests, then the I/O manager 104 processes (at block 562) a read request in the priority read queue 122, such as from the MRU end of the priority read queue 122, to read the requested data from the non-volatile storage device 104 or the sequential access storage medium 114 to return to the read request.

Figure 18:
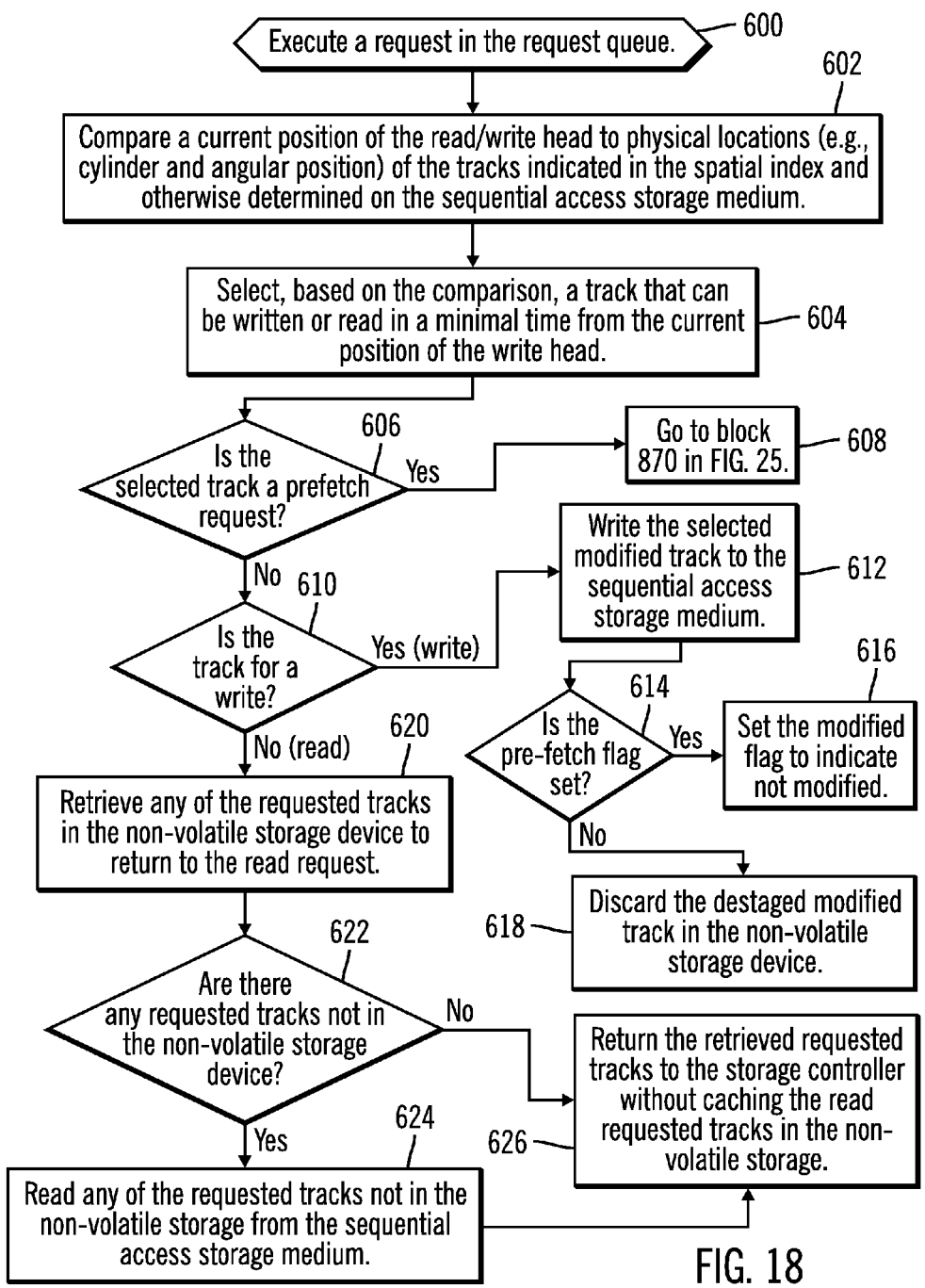
FIG. 18 illustrates an embodiment of operations at the sequential access storage device to process the request queue.

If (at block 560) the I/O manager 104 has completed processing the consecutive first predetermined number of high priority read requests from the priority read queue 122, then control proceeds (at block 564) to block 600 in FIG. 18 to process a second predetermined number of read and write requests in the request queue 116 to avoid starvation at the request queue 116.

In the described embodiments of FIG. 17, a destage operation is performed before a high priority read request. In an alternative embodiment, a high priority read request from the priority read queue 122 may have priority over destage operations to free space in the non-volatile storage device 104. In a further alternative embodiment, a high priority read request and a destage operation may be combined to perform as part of the same disk operation.

FIG. 18 illustrates an embodiment of operations performed by the I/O manager 102 to process the request queue 116 which may be continually repeated while requests are queued in the request queue 116. Upon initiating (at block 600) the processing of the request queue 116, the I/O manager 102 compares (at block 602) a current position of the read/write head 120 with respect to the sequential access storage medium 114 to physical locations (e.g., cylinder and angular position) of the tracks indicated in the spatial index 112 and otherwise determined on the sequential access storage medium. The spatial index 112 may include all the necessary information to determine the track to read or write in closest temporal proximity to the read/write 120 head, such as the cylinder and angular position of the track to read or write, or may include only some of the information, e.g., the cylinder, and the rest of the physical location information needed may be determined from the read/write control unit 118. The I/O manager 102 selects (at block 604), based on the comparison, a track that can be read or written in a minimal time from the current position of the read/write head 120.

Figure 25:
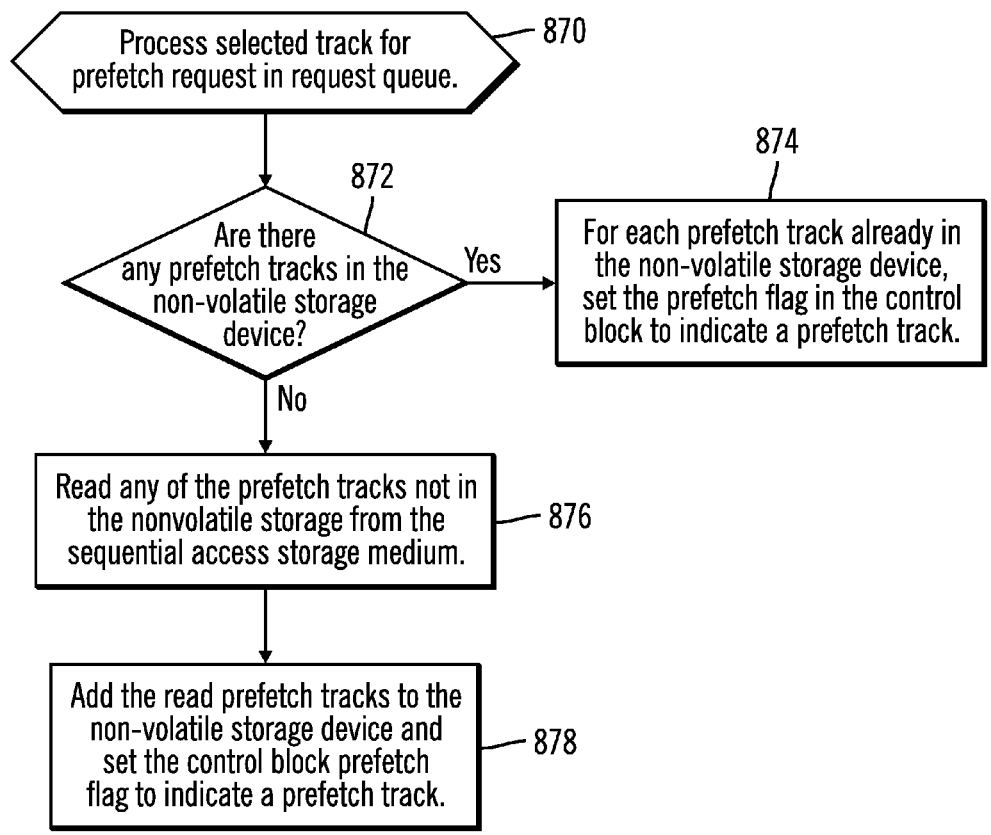
FIG. 25 illustrates an embodiment of operations at the sequential access storage device to process a prefetch request in the request queue.

If (at block 606) the selected track is for a prefetch request of tracks to prefetch, then control proceeds (at block 608) to block 870 in FIG. 25. If (at block 610) the selected track is a modified track for a queued write request in the request queue 116, then the I/O manager 102 writes (at block 612) the selected modified track to the sequential access storage medium 114. If (at block 614) the pre-fetch flag 176 of the written track is set to indicate that the track is also a prefetch track, then the modified flag 180 is set (at block 616) to indicate that the track is not modified, but the prefetch track remains in the non-volatile storage device 104 for access. If (at block 614) the written tracks is not also a prefetch track, then the destaged modified track is discarded (at block 618) from the non-volatile storage device 104. If (at block 610) the selected track is for a read request, then the I/O manager 102 retrieves (at block 620) any of the requested tracks in the non-volatile storage device 104 to return to the read request. If (at block 622) there are requested tracks not in the non-volatile storage device 104, then the I/O manager 102 reads (at block 624) the requested tracks not in the non-volatile storage device 104 from the sequential access storage medium 114. After gathering all the requested read data (from block 624 or from the no branch of block 622), the I/O manager 102 returns (at block 626) the retrieved requested tracks to the storage controller 4 without caching the read requested tracks in the non-volatile storage 104.

In an embodiment, where the sequential access storage device 100 comprises a hard disk drive and the sequential access storage medium 114 comprises a magnetic disk, the spatial index indicates a cylinder of the track on magnetic disk. To determine the track that can be accessed in the minimal time from the current position of the read/write head 120, the I/O manager 102 may analyze the cylinder and angular position of the tracks to read or write in the spatial index 112 to estimate the times for the read/write head 120 to seek to the cylinders of the tracks and rotate the disk under the read/write head 120 to reach the angular positions of the requested tracks. The I/O manager may then select a modified track having a minimal of the estimated access times.

In a further embodiment the sequential access storage device 114 may comprise a hard disk drive having multiple disk platters and multiple write heads to write to each platter. The I/O manager 102 may determine the estimated time to seek and rotate to each modified track on each disk platter from the current position of the write heads to select a modified track having the minimal estimated time to access across the disk platters.

In an alternative, lower priority requests in the request queue 116 may be processed according to a temporal ordering, not just a spatial ordering of the requested tracks.

In addition, if the I/O manager 104 determines that a destage operation needs to be performed to destage modified tracks in the non-volatile storage device 104 to the sequential access storage medium 114 to free space in the non-volatile storage medium 104, then the destage operation may interrupt the processing of the requests in the priority read queue 122 and the request queue 116.

Figure 19:
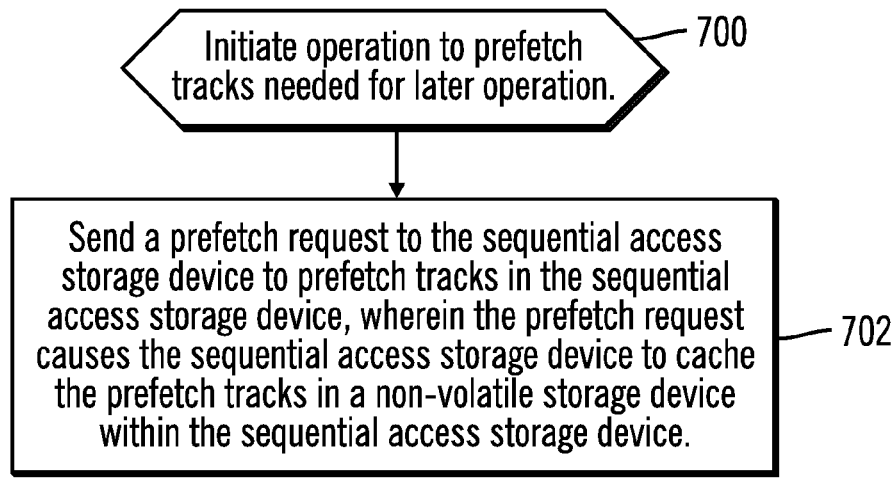
FIGS. 19 and 22 illustrate embodiments of operations to initiate an operation to prefetch tracks.

FIG. 19 illustrates an embodiment of operations performed by the storage manager 22 in the storage controller 4 to prefetch data in the sequential access storage device 104 needed for a later operation. In response to initiating (at block 700) the prefetch command, the storage manager 22 sends (at block 702) a prefetch request to the sequential access storage device 100 to prefetch tracks in the sequential access storage device. In one embodiment, the prefetch request causes the sequential access storage device 100 to cache the prefetch tracks in the non-volatile storage device 104 within the sequential access storage device 100.

Figure 20:
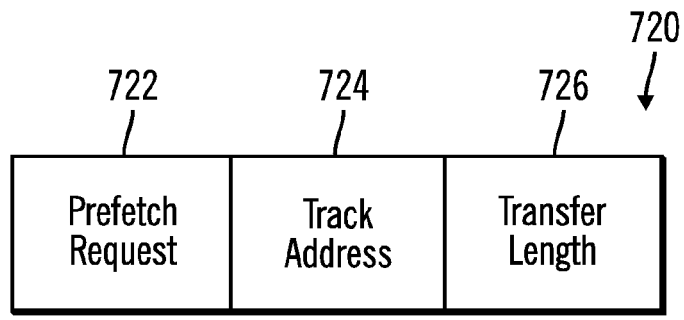
FIG. 20 illustrates an embodiment of a prefetch request.

FIG. 20 illustrates an embodiment of a prefetch request 720, including a prefetch request 722 operation code, a track address 724 indicating a starting track in the sequential access storage medium 114 at which to start prefetching, and a transfer length 726 indicating a start of the prefetch.

Figure 21:
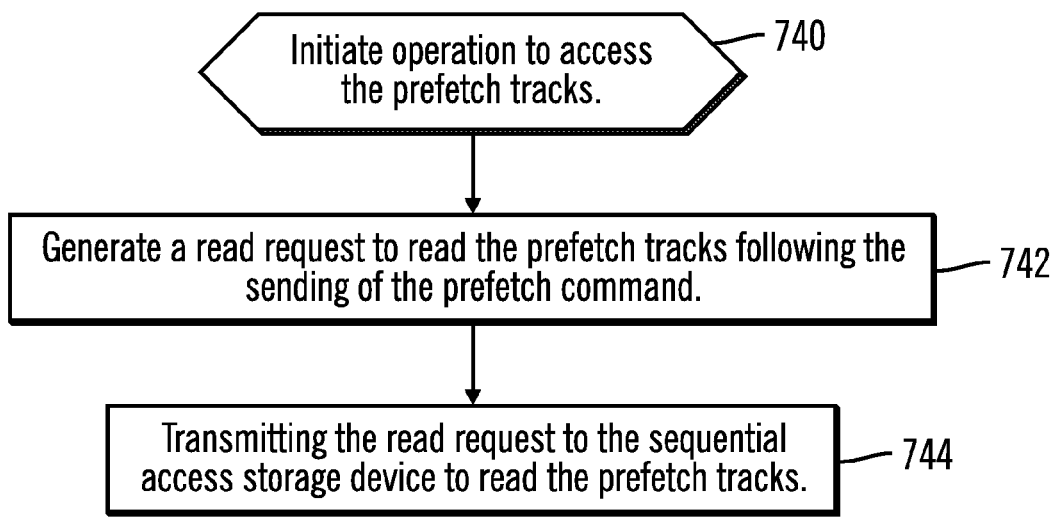
FIGS. 21 and 23 illustrate embodiments of operations to access prefetch tracks.

FIG. 21 illustrates an embodiment of operations performed by the storage manager 22 to access the prefetch data prefetched by the prefetch request 720. Upon initiating (at block 740) an operation to access the prefetch tracks, the storage manager 22 of the storage controller 4 generates (at block 742) a read request to read the prefetch tracks following the sending of the prefetch command. The storage manager 22 transmits (at block 744) the read request to the sequential access storage device 100 to read the prefetch tracks. In one embodiment, the read request to read the prefetch tracks from the sequential access storage device 100 may comprise a high priority read request.

In described embodiments, the prefetch request is designated to be processed at a lower priority than the read request. The prefetch request is added to the request queue 116, where it is processed according to a spatial ordering of the read and write tracks in the request queue 116. Whereas, if the read request is to be processed against the sequential access storage medium 114, such as the case if the prefetch tracks were not in the non-volatile storage device 104, then the read request would be processed at a higher priority based on a temporal ordering of the read requests in the priority read queue 122 as described with respect to FIG. 17, which provides higher priority processing over the spatial ordering processing of the request queue 116. For instance, an application or process operating at a high priority may anticipate the need for certain tracks at a later time for an operation, so can prefetch those tracks at a lower priority than the high priority at which the application/process is operating. However, when the application/process eventually needs the data and issues a read request for the tracks that were prefetched, the read request is at the high priority at which the application is operating.

Figure 22:
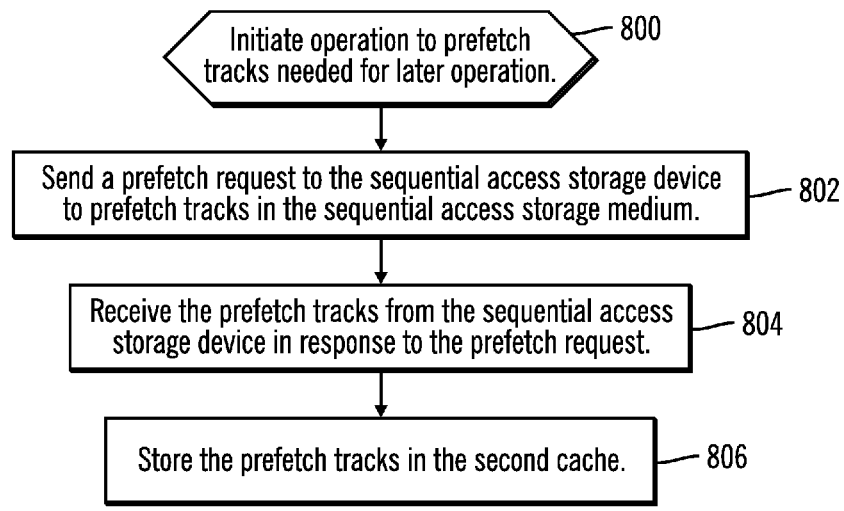
Figure 23:
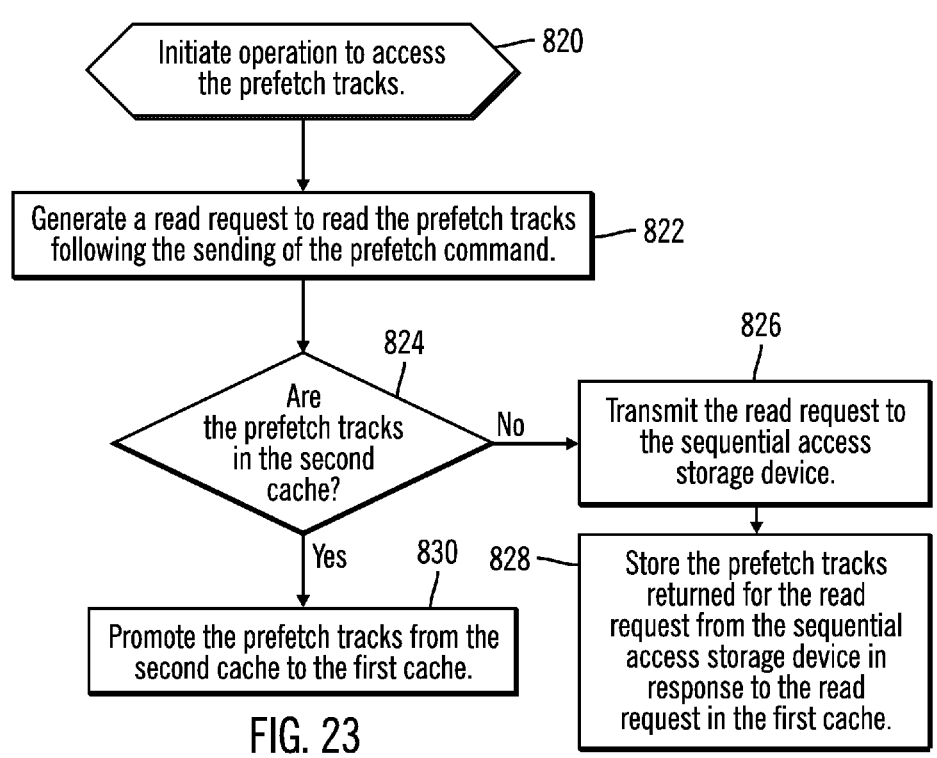

FIGS. 22 and 23 illustrate an alternative embodiment where the storage manager 22 issues the prefetch request to the sequential access storage device 100 to prefetch tracks to the second cache 18 and then issues the read request to access the prefetch tracks from the second cache 18 to promote to the first cache 14 to use. In the embodiment of FIGS. 22 and 23, the sequential access storage device 100 may not have a non-volatile storage device 104, and the second cache device resides in the storage controller 4 as the second cache 18. With respect to FIG. 22, to initiate (at block 800) the operation to prefetch tracks needed for a later operation, the storage manager 22 sends (at block 802) a prefetch request to the sequential access storage device 100 to prefetch tracks in the sequential access storage medium 114. Upon receiving (at block 804) the prefetch tracks from the sequential access storage device 100 in response to the prefetch request, the storage manager 22 stores (at block 806) the prefetch tracks in the second cache 18.

FIG. 23 illustrates an embodiment of operations performed by the storage manager 22 and/or cache manager 24 to access the prefetch tracks. Upon imitating (at block 820) the operation to read the prefetch tracks, the storage manager 22 generates (at block 822) a read request to read the prefetch tracks following the sending of the prefetch command. The cache manager 24 (or storage manager 22) may process the read request by determining (at block 824) whether the prefetch tracks are in the second cache 18. If not (from the no branch of block 824), the cache manager 24 transmits (at block 826) the read request to the sequential access storage device 100 and stores (at block 828) the prefetch tracks returned for the read request from the sequential access storage device 100 in response to the read request in the first cache 14. If (from the yes branch of block 824) the prefetch tracks are in the second cache 18, the cache manager 24 promotes (at block 830) the prefetch tracks from the second cache 18 to the first cache 14 to be available for use by an application.

The prefetch and read operations of FIGS. 19 and 21 are directed to a sequential access storage device 100 that includes a non-volatile storage device 104, which operates as the second cache device to the first cache 14, such as shown in FIG. 4. The prefetch and read operations of FIGS. 22 and 23 may be directed to a sequential access storage device that may not have a non-volatile storage device for caching because in FIGS. 22 and 23, the caching of the prefetch tracks is performed in the second cache 18 (second cache device) in the storage controller 4.

Figure 24:
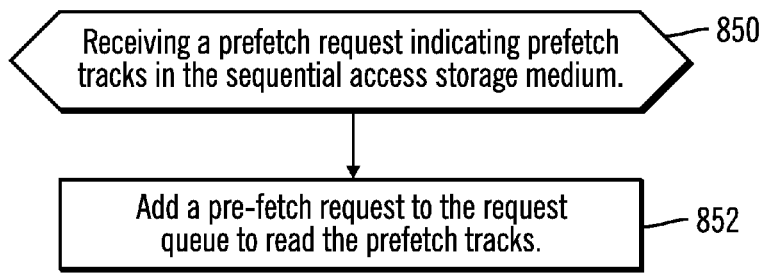
FIG. 24 illustrates an embodiment of operations at the sequential access storage device to process a received prefetch request.

FIG. 24 illustrates an embodiment of operations performed by the I/O manager 102 in the sequential access storage device 100 to process a prefetch request 720 (FIG. 20). Upon receiving (at block 850) a prefetch request 720 indicating prefetch tracks in the sequential access storage medium 114, the I/O manager 102 adds (at block 852) a prefetch request to the request queue 116 to read the prefetch tracks. A single prefetch for all prefetch tracks may be added for all the tracks to prefetch or one prefetch request may be added for each prefetch track.

FIG. 25 illustrates an embodiment of operations performed by the I/O manager 102 to process a prefetch request in the request queue 116 from block 608 in FIG. 18. Upon processing (at block 870) the selected one or more tracks for the prefetch request in the request queue 116, the I/O manager 102 determines (at block 872) whether the selected prefetch track is in the non-volatile storage device 104. If so (from the yes branch of bock 872), the I/O manager 102, sets (at block 874) the prefetch flag 176 in the control block for each prefetch track already in the non-volatile storage device 104 to indicate a prefetch track. If (from the no branch of block 872) some or all of the prefetch tracks are not in the non-volatile storage device 104, then the I/O manager 102 reads (at block 876) any of the prefetch tracks not in the non-volatile storage device 104 from the sequential access storage medium 114 and adds (at block 878) the read prefetch tracks to the non-volatile storage device 104 and sets the control block prefetch flag 176 for the prefetch tracks to indicate a prefetch track.

Figure 26:
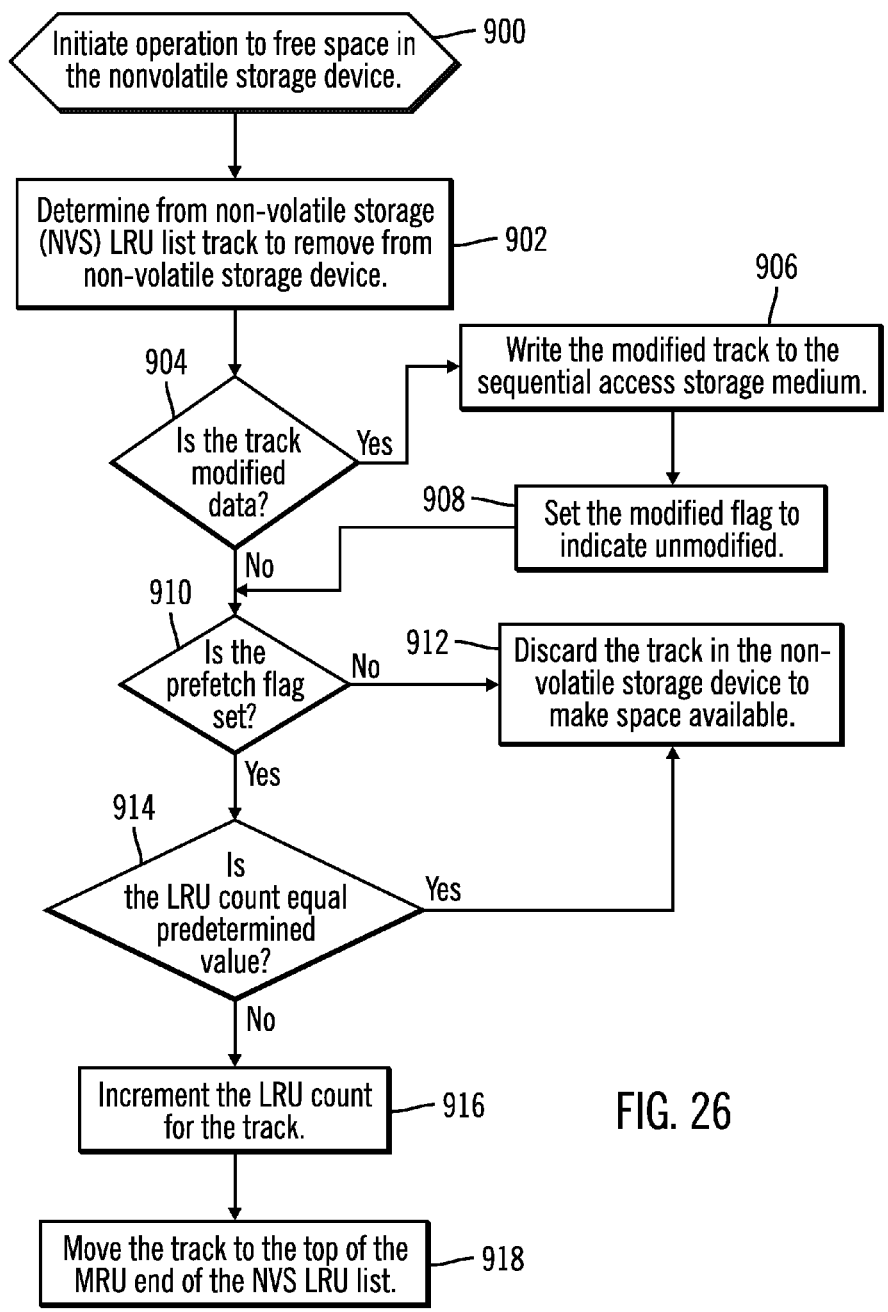
FIG. 26 illustrates an embodiment of operations at the sequential access storage device to free space in the non-volatile storage device in the sequential access storage device.

FIG. 26 illustrates an embodiment of operations performed by the I/O manager 102 to free space in the non-volatile storage device 104. Upon initiating (at block 900) an operation to free space, the I/O manager 102 determines (at block 902) from the non-volatile storage (NVS) LRU list 126 a track to remove from the non-volatile storage device 104. If (at block 904) the track has modified data, as indicated by the modified flag 180, then the modified track is written (at block 906) to the sequential access storage medium 114 and the modified flag 180 is set (at block 908) to indicate the track as unmodified. If (at block 904) the track is not modified data or after writing the track (from block 908), a determination is made (at block 910) whether the prefetch flag 178 is set, i.e., the track is a prefetch track. If (at block 910) the selected track is not a prefetch track, then the I/O manager 102 discards (at block 912) the track in the non-volatile storage device 104 to make space available. If (at block 910) the track is a prefetch track, then a determination (at block 914) is made whether the LRU count 178 for the track is equal to the predetermined value, maximum number of times through the LRU list 126. If (at block 914) the LRU count 178 is the predetermined value, control proceeds to block 912 to discard the track. Otherwise, if the LRU count 178 is not the predetermined value, then the LRU count 178 for the track is incremented (at block 916) and the indicator for the track is moved (at block 918) to the MRU end of the NVS LRU list 126.

Described embodiments provide techniques for allowing the use of a second level cache device between a primary or first level cache device and a storage to store prefetch tracks from the storage to make available for a subsequent read request to provide faster access than if the tracks were retrieved from the sequential access storage device when needed.

Described embodiments further provide a non-volatile storage device 104, such as a flash memory, in the sequential access storage device 100 to operate as a second cache device and provide caching of modified tracks and prefetch tracks, where read requests to the prefetch tracks can be returned from the non-volatile storage device 104 with faster access than if returned from the sequential access medium 114 to improve read performance when the tracks are needed. Further, write performance may be improved by returning complete to the write in response to the write being stored in the non-volatile storage device 104 before being destaged to the sequential access storage medium 114.

Further benefits are realized by allowing priority indication of read requests so that high priority read requests and the prefetch requests will not be unduly delayed in being processed as a result of operations to destage modified tracks to the sequential access storage medium 114. In this way, high priority read and prefetch requests may be processed at a higher priority than lower priority read requests and destage requests to destage modified tracks for write requests cached in the non-volatile storage device 104.

Further, with the described embodiments, the lower priority read requests in the request queue are processed based on a spatial ordering of the received lower priority read requests and destage requests for write requests in the request queue. High priority read and prefetch requests are processed based on a temporal ordering of the received high priority read requests. However, modified tracks for write requests and low priority read requests are processed based on a spatial ordering of the write requests, low priority read requests, and a current position of the read/write head 120 to optimize the seek and latency delays for the read and write requests.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 9-19 and 21-26 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
    managing data in a sequential access storage device receiving read requests and write requests from a system with respect to tracks stored in a sequential access storage medium;
    receiving a prefetch request from the system indicating prefetch tracks in the sequential access storage medium;
    processing the prefetch request to read the prefetch tracks from the sequential access storage medium;
    caching the accessed prefetch tracks in a non-volatile storage device integrated with the sequential access storage device, wherein the non-volatile storage device is a faster access device than the sequential access storage medium;
    receiving a read request for the prefetch tracks following the caching of the prefetch tracks, wherein the prefetch request is designated to be processed at a lower priority than the read request with respect to the sequential access storage medium; and
    returning the prefetch tracks from the non-volatile storage device to the read request.

2. The method of claim 1, further comprising:
    determining whether the prefetch tracks in the read request are in the non-volatile storage device in response to receiving the read request, wherein the requested tracks are returned from the non-volatile storage device in response to the read request;
    reading the prefetch tracks in the read request from the sequential access storage device in response to determining that the requested tracks are not located in the non-volatile storage device; and
    returning the prefetch tracks read from the sequential access storage device to the read request.

3. The method of claim 2, further comprising:
    queueing the prefetch request in a request queue in response to receiving the prefetch request, wherein the read to the sequential access storage device for the read request is processed at a higher priority than the read for the prefetch request.

4. The method of claim 3, wherein the request queue queues read requests having a first priority, further comprising:
    maintaining a priority read queue queuing read requests having a second priority, wherein read requests having the second priority are accessed from the priority read queue, wherein processing of the read requests in the priority read queue has higher priority than processing requests in the request queue;
    adding the read request for the prefetch tracks to the priority read queue in response to determining that the prefetch tracks are not located in the non-volatile storage device, wherein the prefetch tracks of the read request are read according to an ordering or read requests in the priority read queue; and
    returning the prefetch tracks to the read request in response to accessing the prefetch tracks when processing the read request without caching the prefetch tracks in the non-volatile storage device.

5. The method of claim 3, further comprising:
    caching received modified tracks for write requests in the non-volatile storage device; and
    adding a destage request to the request queue for received write requests having modified tracks for the sequential access storage medium cached in the non-volatile storage device.

6. The method of claim 1, wherein the prefetch request is designated to be processed according to a spatial ordering of tracks to read and write on the sequential access storage medium and wherein the read request is designated to be processed according to a temporal ordering of when the read request was received.

7. A method for requesting data from a sequential access storage device, comprising:

sending a prefetch request to the sequential access storage device to prefetch tracks in the sequential access storage device to a first non-volatile storage device, wherein the prefetch request is designated to be processed in the sequential access storage device at a first priority;

generating a read request to read the prefetch tracks following the sending of the prefetch request, wherein the read request is designated to be processed at a second priority at the sequential access storage device, wherein the first priority has a lower priority processing in the sequential access storage device than the higher priority; and storing the read tracks returned to the read request from the first non-volatile storage device in a second non-volatile storage device.

8. The method of claim 7, wherein the first and the second non-volatile storage devices are in a storage controller external to the sequential access storage device, further comprising:

processing the read request to determine whether the prefetch tracks are in the first non-volatile storage device;

promoting the prefetch tracks from the first non-volatile storage device to the second non-volatile storage device in response to determining that the prefetch tracks are in the first non-volatile storage device; and transmitting the read request to the sequential access storage device in response to determining that the prefetch tracks are not in the first non-volatile storage device.

9. The method of claim 7, wherein the first non-volatile storage device is within the sequential access storage device and the second non-volatile storage device is in a storage controller external to the sequential access storage device.

10. The method of claim 7, further comprising:

initiating an operation to remove unmodified tracks in the first non-volatile storage device to free space in the first non-volatile storage device;

determining an unmodified track at a Least Recently Used (LRU) end of an unmodified LRU list;

determining whether the determined unmodified track comprises a prefetch track;

determining whether a counter of the prefetch track is at a predetermined value;

removing the determined unmodified tracks from the first non-volatile storage device in response to determining that the unmodified track is not the prefetch track or in response to determining that the counter of the prefetch track is at the predetermined value; and moving the prefetch track to a most recently used (MRU) end of the LRU list and incrementing the counter of the prefetch track in response to determining that the counter is less than the predetermined value.

11. The method of claim 7, wherein the second non-volatile storage device is a faster access device than the first non-volatile storage device.

* * * * *